United States Patent
Liu

(10) Patent No.: US 10,033,428 B2
(45) Date of Patent: Jul. 24, 2018

(54) METHOD FOR REDUCING SELF-INTERFERENCE SIGNAL IN COMMUNICATIONS SYSTEM, AND APPARATUS

(71) Applicant: Huawei Technologies Co., Ltd., Shenzhen (CN)

(72) Inventor: Sheng Liu, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 71 days.

(21) Appl. No.: 15/167,609

(22) Filed: May 27, 2016

(65) Prior Publication Data

US 2016/0277063 A1 Sep. 22, 2016

Related U.S. Application Data

(63) Continuation of application No. PCT/CN2013/088229, filed on Nov. 29, 2013.

(51) Int. Cl.
*H04B 1/525* (2015.01)
*H04B 5/00* (2006.01)
(Continued)

(52) U.S. Cl.
CPC ........... *H04B 1/525* (2013.01); *H04B 5/0025* (2013.01); *H04L 5/0048* (2013.01); *H04L 5/14* (2013.01)

(58) Field of Classification Search
CPC ...................................................... H04B 1/525
See application file for complete search history.

(56) References Cited

U.S. PATENT DOCUMENTS 5,784,024 A  7/1998 Heide et al.
2006/0098765 A1  5/2006 Thomas et al.
(Continued)

FOREIGN PATENT DOCUMENTS

CN  1150477 A  5/1997
CN  1741423 A  3/2006
(Continued)

OTHER PUBLICATIONS

Liu et al., "Single time Echo Based on Adaptive Regularization Algorithm a New Method of Superresolution," Science in China, Series E (Apr. 1999).

*Primary Examiner* — Gerald A Smarth
(74) *Attorney, Agent, or Firm* — Leydig, Voit & Mayer, Ltd.

(57) ABSTRACT

Embodiments of the present invention provide a method for reducing a self-interference signal in a communications system, and an apparatus. The method includes: sending a sounding signal and a first communication signal; receiving an input signal; separating a near-field reflection signal corresponding to the sounding signal from an echo signal of the input signal; determining, based on the near-field reflection signal, a near-field reflection channel parameter; determining, based on the near-field reflection channel parameter, a reconstructed near-field reflected self-interference signal; and subtracting the reconstructed near-field reflected self-interference signal from a received second communication signal. The present invention can effectively recognize and reconstruct a near-field reflection signal, thereby reducing a near-field reflected self-interference signal in self-interference.

13 Claims, 17 Drawing Sheets

(51) Int. Cl.
*H04L 5/00* (2006.01)
*H04L 5/14* (2006.01)

(56) References Cited

U.S. PATENT DOCUMENTS

| | | |
|---|---|---|
| 2008/0089397 A1 | 4/2008 | Vetter et al. |
| 2009/0232118 A1 | 9/2009 | Wang et al. |
| 2010/0029350 A1 | 2/2010 | Zhang |
| 2010/0118922 A1 | 5/2010 | Ahn |
| 2012/0201153 A1 | 8/2012 | Bharadia et al. |
| 2012/0322511 A1* | 12/2012 | Fox .................. G10L 21/0208 455/570 |
| 2013/0089021 A1 | 4/2013 | Gaal et al. |
| 2014/0003611 A1* | 1/2014 | Mohammad .......... H04R 3/005 381/66 |
| 2015/0350395 A1* | 12/2015 | Jiang .................. H04R 3/005 455/570 |
| 2016/0036958 A1* | 2/2016 | Logan ................ G05B 19/042 455/414.1 |

FOREIGN PATENT DOCUMENTS

| | | |
|---|---|---|
| CN | 101425823 A | 5/2009 |
| CN | 101529729 A | 9/2009 |
| CN | 103095351 A | 5/2013 |
| CN | 103338172 A | 10/2013 |
| KR | 101236078 B1 | 2/2013 |

\* cited by examiner

METHOD FOR REDUCING SELF-INTERFERENCE SIGNAL IN COMMUNICATIONS SYSTEM, AND APPARATUS

CROSS-REFERENCE TO RELATED APPLICATIONS

This application is a continuation of International Patent Application No. PCT/CN2013/088229, filed on Nov. 29, 2013, which is hereby incorporated by reference in its entirety.

TECHNICAL FIELD

Embodiments of the present invention relate to the field of wireless communications technologies, and in particular, to a method for reducing a self-interference signal in a communications system, and an apparatus.

BACKGROUND

In a wireless communications system such as a mobile cellular communications system, a wireless local area network (Wireless Local Area Network, WLAN), and fixed wireless access (Fixed Wireless Access, FWA), a communications node such as a base station (Base Station, BS), an access point (Access Point, AP), a relay station (Relay Station, RS), or user equipment (User Equipment, UE) usually has capabilities of sending a signal of the communications node and receiving a signal of another communications node. Because a wireless signal is greatly attenuated on a wireless channel, compared with a signal sent by the communications node, a signal coming from a communications transmit end is very weak when arriving at a receive end. For example, a difference between a power for receiving a signal and a power for sending a signal by a communications node in a mobile cellular communications system can reach 80 dB to 120 dB or can be even larger. Therefore, to avoid interference (such interference is referred to as self-interference, Self-interference) to a received signal of a communications node from a sending signal of the communications node, transmission and reception of a wireless signal are distinguished by using different frequency bands or time periods. For example, in frequency division duplex (Frequency Division Duplex, FDD), communications in transmission and reception are performed by using different frequency bands separated by a certain guard band. In time division duplex (Time Division Duplex, TDD), communications in transmission and reception are performed by using different time periods separated by a certain guard interval. The guard band in the FDD system and the guard interval in the TDD system are both for the purpose of ensuring that reception and transmission are thoroughly separated, thereby avoiding interference to reception from transmission.

In the wireless full duplex technology, reception and transmission operations can be simultaneously performed on a same wireless channel. Theoretically, the spectral efficiency of the wireless full duplex technology is twice as high as that of the FDD technology or the TDD technology. However, because there is no guard band or guard interval, a transmitted signal of a communications node that supports wireless full duplex may result in self-interference to a received signal of the communications node, causing that the communications node cannot correctly receive a wanted signal. A self-interference signal includes a near-field reflected self-interference signal on a near-field reflection channel and a far-field reflected self-interference signal on a far-field reflection channel. The near-field reflected self-interference signal typically corresponds to a near-field reflection path of 0.3 m to 60 m, and a multi-path transmission delay is 1 ns to 400 ns. Because propagation environments around a transceiving antenna change slightly, a delay of the near-field reflected self-interference signal changes slightly and slowly with time. The near-field reflected self-interference signal is self-interference that is the most difficult to cancel effectively in a wireless full duplex system, and reasons are as follows: Because a propagation distance of a near-field multi-path echo signal is relatively short, a propagation delay difference between multiple paths is very small, when a communication signal of a normal bandwidth (10 to 40 MHz) is used, the near-field reflected self-interference signal cannot be effectively recognized or reconstructed, and effective interference cancellation cannot be implemented. For example, a difference between delays generated when a radio frequency signal sent by a communications node reaches two reflectors whose straight-line propagation distances from the communications node have a difference of 3 meters is 20 ns, and it is very difficult to distinguish between two echoes having different multi-path delays. Due to a relatively large multi-path delay difference, a component of a far-field reflected self-interference signal can be recognized when a signal having a normal bandwidth is used, thereby implementing effective cancellation. Therefore, how to reduce a near-field reflected self-interference signal to improve use efficiency of the wireless full duplex system is a problem to be resolved.

SUMMARY

Embodiments of the present invention provide a method for reducing a self-interference signal in a communications system, and an apparatus, which can effectively reduce a near-field reflected self-interference signal, thereby achieving an objective of improving use efficiency of a wireless full duplex system.

According to a first aspect, an embodiment of the present invention provides a wireless full duplex communications apparatus, where the apparatus includes: a sending unit, configured to send a sounding signal and a first communication signal, where a timeslot used for sending the sounding signal is different from a timeslot used for sending the first communication signal, and the sounding signal is a large time-bandwidth product signal; a receiving unit, configured to receive an input signal, where the input signal includes a second communication signal sent by another apparatus and an echo signal that corresponds to the sounding signal and the first communication signal; a signal separation unit, configured to separate a near-field reflection signal corresponding to the sounding signal from the echo signal; a processing unit for a near-field reflected self-interference signal, configured to determine, based on the near-field reflection signal, a near-field reflection channel parameter; and a cancellation unit for a near-field reflected self-interference signal, configured to determine, based on the near-field reflection channel parameter, a reconstructed near-field reflected self-interference signal, and subtract the reconstructed near-field reflected self-interference signal from the second communication signal.

With reference to the first aspect, in a first possible implementation manner, the cancellation unit for a near-field reflected self-interference signal is specifically configured to determine the reconstructed near-field reflected self-interference signal according to the near-field reflection channel parameter and the first communication signal, and subtract the reconstructed near-field reflected self-interference signal from the second communication signal.

With reference to the first aspect, in a second possible implementation manner, the apparatus further includes: a coupling unit, configured to sample a signal to be sent, to obtain a self-interference radio frequency reference signal, where the cancellation unit for a near-field reflected self-interference signal is specifically configured to determine the reconstructed near-field reflected self-interference signal according to the near-field reflection channel parameter and the self-interference radio frequency reference signal, and subtract the reconstructed near-field reflected self-interference signal from the second communication signal.

With reference to the first aspect or either of the foregoing possible implementation manners, in a third possible implementation manner, the sending unit is specifically configured to send the sounding signal by using a bandwidth greater than a bandwidth used for sending the first communication signal; and the processing unit for a near-field reflected self-interference signal is specifically configured to perform matched filtering on the near-field reflection signal, to obtain a filtered near-field reflection signal, and determine the near-field reflection channel parameter according to the filtered near-field reflection signal.

With reference to the first aspect or either of the first possible implementation manner and the second possible implementation manner, in a fourth possible implementation manner, the sending unit is specifically configured to send the sounding signal by using a bandwidth greater than or equal to a bandwidth used for sending the first communication signal; and the processing unit for a near-field reflected self-interference signal is specifically configured to determine, by using a super-resolution delay algorithm, the near-field reflection channel parameter corresponding to the near-field reflection signal.

With reference to the fourth possible implementation manner, in a fifth possible implementation manner, the processing unit for a near-field reflected self-interference signal is specifically configured to determine the near-field reflection channel parameter by using the following formulas:

$$\grave{h}^{(k)} = (B + \text{diag}\{w^{(k)}\})^{-1}b, \text{ and } w^{(k)} = \left[1 + \kappa - \frac{|\grave{h}^{(k-1)}|}{\max|\grave{h}^{(k-1)}|}\right] ow^{(k-1)},$$

where $\grave{h}^{(k)}$ represents the near-field reflection channel parameter, the superscript k of $\grave{h}^{(k)}$ identifies a result of the $k^{th}$ iteration, $B=A^H A$, A represents a sounding signal matrix, $b=A^H r$, r represents the near-field reflection signal, $w^{(k)}$ represents a weighting vector of the $k^{th}$ iteration, an initial value of the weighting vector is $w^{(0)}=\alpha 1_{M\times 1}$, $1_{M\times 1}$ represents an M×1-dimension column vector whose elements are all 1, M represents a multi-path delay distribution range of a near-field reflection channel, an operator "C" represents that elements corresponding to two vectors are multiplied, and κ, k, and α are preset positive integers used for adjusting a convergence property.

With reference to the fifth possible implementation manner, in a sixth possible implementation manner, when B is a conjugate matrix, the processing unit for a near-field reflected self-interference signal is specifically configured to perform calculation through iteration from m=1 to m=M by using the following formula, to obtain $(B+\text{diag}\{w^{(k)}\})^{-1}$:

$$B_m^{-1} = D_{m-1} - \frac{w_m^{(k)}}{1 + w_m^{(k)} d_{m-1,mm}} d_{m-1,m} d_{m-1,m}^H, m = 1, 2, \Lambda, M$$

wherein $B_m = B_{m-1} + w_m^{(k)} e_m e_m^H$, $D_{m-1} = B_{m-1}^{-1} = [d_{m-1,1}, d_{m-1,2}, \Lambda, d_{m-1,M}]$, and especially, $B_0 = B$, $B_M^{-1} = (B + \text{diag}\{w^{(k)}\})^{-1}$, $d_{m-1,m}$ is the $m^{th}$ column vector of a matrix $D_{m-1}$, $d_{m-1,mm}$ is an element in the $m^{th}$ row and $m^{th}$ column of the matrix $D_{m-1}$, and $e_i$ represents an M×1-dimension column vector in which the $i^{th}$-column elements are 1 and the other elements are all 0.

With reference to the first aspect or any one of the foregoing possible implementation manners, in a seventh possible implementation manner, the sending unit is specifically configured to send a sounding signal in a radio frequency signal by using a power less than a power used for sending a data signal in the radio frequency signal.

With reference to the first aspect or any one of the foregoing possible implementation manners, in an eighth possible implementation manner, the processing unit for a near-field reflected self-interference signal is further configured to accumulate multiple near-field reflection channel parameters, and determine an average value of the multiple near-field reflection channel parameters; and the cancellation unit for a near-field reflected self-interference signal is specifically configured to determine the reconstructed near-field reflected self-interference signal according to the average value of the multiple near-field reflection channel parameters, and subtract the reconstructed near-field reflected self-interference signal from the second communication signal.

With reference to the first aspect or any one of the foregoing possible implementation manners, in a ninth possible implementation manner, when the apparatus supports multiple-input multiple-output MIMO, the sending unit is specifically configured to send the radio frequency signal separately by using multiple antennas; and the receiving unit is specifically configured to receive the input signal separately by using the multiple antennas, where timeslots used for sending the sounding signal by the multiple antennas are staggered.

With reference to the first aspect or any one of the foregoing possible implementation manners, in a tenth possible implementation manner, the sending unit is specifically configured to send the radio frequency signal by using a timeslot that is staggered with a timeslot used for sending a radio frequency signal by an adjacent apparatus supporting wireless full duplex.

According to a second aspect, an embodiment of the present invention provides a wireless full duplex communications apparatus, where the apparatus includes: a transmitter, configured to send a sounding signal and a first communication signal, where a timeslot used for sending the sounding signal is different from a timeslot used for sending the first communication signal, and the sounding signal is a large time-bandwidth product signal; a receiver, configured to receive an input signal, where the input signal includes a second communication signal sent by another apparatus and an echo signal that corresponds to the sounding signal and the first communication signal; and a processor, configured to separate a near-field reflection signal corresponding to the sounding signal from the echo signal, where the processor is further configured to determine, based on the near-field reflection signal, a near-field reflection channel parameter; and the processor is further configured to determine, based on the near-field reflection channel parameter, a reconstructed near-field reflected self-interference signal, and subtract the reconstructed near-field reflected self-interference signal from the second communication signal.

With reference to the second aspect, in a first possible implementation manner, the processor is specifically configured to determine the reconstructed near-field reflected self-interference signal according to the near-field reflection channel parameter and the first communication signal, and subtract the reconstructed near-field reflected self-interference signal from the second communication signal.

With reference to the second aspect, in a second possible implementation manner, the apparatus further includes: a coupler, configured to sample a signal to be sent, to obtain a self-interference radio frequency reference signal, where the processor is specifically configured to determine the reconstructed near-field reflected self-interference signal according to the near-field reflection channel parameter and the self-interference radio frequency reference signal, and subtract the reconstructed near-field reflected self-interference signal from the second communication signal.

With reference to the second aspect or either of the foregoing possible implementation manners, in a third possible implementation manner, the transmitter is specifically configured to send the sounding signal by using a bandwidth greater than a bandwidth used for sending the first communication signal; and the processor is specifically configured to perform matched filtering on the near-field reflection signal, to obtain a filtered near-field reflection signal, and determine the near-field reflection channel parameter according to the filtered near-field reflection signal.

With reference to the second aspect or either of the first possible implementation manner and the second possible implementation manner, in a fourth possible implementation manner, the transmitter is specifically configured to send the sounding signal by using a bandwidth greater than or equal to a bandwidth used for sending the first communication signal; and the processor is specifically configured to determine, by using a super-resolution delay algorithm, the near-field reflection channel parameter corresponding to the near-field reflection signal.

With reference to the fourth possible implementation manner, in a fifth possible implementation manner, the processor is specifically configured to determine the near-field reflection channel parameter by using the following formulas:

$$\overset{)}{h}{}^{(k)} = (B + \text{diag}\{w^{(k)}\})^{-1}b, \text{ and } w^{(k)} = \left[1 + \kappa - \frac{|\overset{)}{h}{}^{(k-1)}|}{\max|\overset{)}{h}{}^{(k-1)}|}\right] \circ w^{(k-1)},$$

where $\overset{)}{h}{}^{(k)}$ represents the near-field reflection channel parameter, the superscript k of $\overset{)}{h}{}^{(k)}$ identifies a result of the $k^{th}$ iteration, $B=A^H A$, A represents a sounding signal matrix, $b=A^H r$, r represents the near-field reflection signal, $w^{(k)}$ represents a weighting vector of the $k^{th}$ iteration, an initial value of the weighting vector is $w^{(0)}=\alpha 1_{M\times 1}$, $1_{M\times 1}$ represents an M×1-dimension column vector whose elements are all 1, M represents a multi-path delay distribution range of a near-field reflection channel, an operator "∘" represents that elements corresponding to two vectors are multiplied, and κ, k, and α are preset positive integers used for adjusting a convergence property.

With reference to the fifth possible implementation manner, in a sixth possible implementation manner, when B is a conjugate matrix, the processor is specifically configured to perform calculation through iteration from m=1 to m=M by using the following formula, to obtain $(B+\text{diag }\{w^{(k)}\})^{-1}$:

$$B_m^{-1} = D_{m-1} - \frac{w_m^{(k)}}{1+w_m^{(k)}d_{m-1,mm}}d_{m-1,m}d_{m-1,m}^H, m=1, 2, \Lambda, M$$

wherein $B_m = B_{m-1} + w_m^{(k)}e_m e_m^H$, $D_{m-1} = B_{m-1}^{-1} = [d_{m-1,1}, d_{m-1,2}, \Lambda, d_{m-1,M}]$, and especially, $B_0 = B$, $B_M^{-1} = (B+\text{diag }\{w^{(k)}\})^{-1}$, $d_{m-1,m}$ is the $m^{th}$ column vector of a matrix $D_{m-1}$, $d_{m-1,mm}$ is an element in the $m^{th}$ row and $m^{th}$ column of the matrix $D_{m-1}$, and $e_i$ represents an M×1-dimension column vector in which the $i^{th}$-column elements are 1 and the other elements are all 0.

With reference to the first aspect or any one of the foregoing possible implementation manners, in a seventh possible implementation manner, the transmitter is specifically configured to send a sounding signal in a radio frequency signal by using a power less than a power used for sending a data signal in the radio frequency signal.

With reference to the second aspect or any one of the foregoing possible implementation manners, in an eighth possible implementation manner, the processor is further configured to accumulate multiple near-field reflection channel parameters, and determine an average value of the multiple near-field reflection channel parameters; and the processor is specifically configured to determine the reconstructed near-field reflected self-interference signal according to the average value of the multiple near-field reflection channel parameters, and subtract the reconstructed near-field reflected self-interference signal from the second communication signal.

With reference to the second aspect or any one of the foregoing possible implementation manners, in a ninth possible implementation manner, when the apparatus supports multiple-input multiple-output MIMO, the transmitter is specifically configured to send the radio frequency signal separately by using multiple antennas; and the receiver is specifically configured to receive the input signal separately by using the multiple antennas, where timeslots used for sending the sounding signal by the multiple antennas are staggered.

With reference to the second aspect or any one of the foregoing possible implementation manners, in a tenth possible implementation manner, the transmitter is specifically configured to send the radio frequency signal by using a timeslot that is staggered with a timeslot used for sending a radio frequency signal by an adjacent apparatus supporting wireless full duplex.

According to a third aspect, an embodiment of the present invention provides a method for canceling a self-interference signal in a communications system, where the method is executed by an apparatus supporting wireless full duplex, and the method includes: sending a sounding signal and a first communication signal, where a timeslot used for sending the sounding signal is different from a timeslot used for sending the first communication signal, and the sounding signal is a large time-bandwidth product signal; receiving an input signal, where the input signal includes a second communication signal sent by another apparatus and an echo signal that corresponds to the sounding signal and the first communication signal; separating a near-field reflection signal corresponding to the sounding signal from the echo signal; determining, based on the near-field reflection signal, a near-field reflection channel parameter; determining, based on the near-field reflection channel parameter, a reconstructed near-field reflected self-interference signal; and subtracting the reconstructed near-field reflected self-interference signal from the second communication signal, where the second communication signal is sent by another apparatus.

With reference to the third aspect, in a first possible implementation manner, the determining, based on the near-field reflection channel parameter, a reconstructed near-field reflected self-interference signal includes: determining the reconstructed near-field reflected self-interference signal according to the near-field reflection channel parameter and the first communication signal.

With reference to the third aspect, in a second possible implementation manner, the method further includes: sampling a signal to be sent, to obtain a self-interference radio frequency reference signal, where the determining, based on the near-field reflection channel parameter, a reconstructed near-field reflected self-interference signal includes: determining the reconstructed near-field reflected self-interference signal according to the near-field reflection channel parameter and the self-interference radio frequency reference signal.

With reference to the third aspect or either of the foregoing possible implementation manners, in a third possible implementation manner, the sending a sounding signal includes: sending the sounding signal in a transmit timeslot in a sounding timeslot.

With reference to the third possible implementation manner, in a fourth possible implementation manner, the sending a sounding signal includes: stopping sending the sounding signal in an idle timeslot in the sounding timeslot, where the idle timeslot includes a first silent timeslot and a second silent timeslot; and sending the first communication signal in a data transmission timeslot.

With reference to the fourth possible implementation manner, in a fifth possible implementation manner, duration of the first silent timeslot is a maximum multi-path delay of a near-field reflection channel, and a value of the second silent timeslot enables a delay of an echo component to exceed a sum of the duration of the first silent timeslot and duration of the second silent timeslot, and a power of an echo multi-path component is less than a preset threshold.

With reference to the third aspect or any one of the foregoing possible implementation manners, in a sixth possible implementation manner, when a bandwidth used for sending the sounding signal is greater than a bandwidth used for sending the first communication signal, the determining, based on the near-field reflection signal, a near-field reflection channel parameter includes: performing matched filtering on the near-field reflection signal, to obtain a filtered near-field reflection signal; and determining the near-field reflection channel parameter according to the filtered near-field reflection signal.

With reference to the third aspect or any one of the first possible implementation manner to the fifth possible implementation manner, in a sixth possible implementation manner, when a bandwidth used for sending the sounding signal is greater than or equal to a bandwidth used for sending the first communication signal, the determining, based on the near-field reflection signal, a near-field reflection channel parameter includes: determining, by using a super-resolution delay algorithm, the near-field reflection channel parameter corresponding to the near-field reflection signal.

With reference to the sixth possible implementation manner, in a seventh possible implementation manner, the determining, by using a super-resolution delay algorithm, the near-field reflection channel parameter corresponding to the near-field reflection signal includes: determining the near-field reflection channel parameter by using the following formulas:

$$\grave{h}^{(k)} = (B + \text{diag}\{w^{(k)}\})^{-1} b, \text{ and } w^{(k)} = \left[1 + \kappa - \frac{|\grave{h}^{(k-1)}|}{\max|\grave{h}^{(k-1)}|}\right] \text{o} w^{(k-1)},$$

where $\grave{h}^{(k)}$ represents the near-field reflection channel parameter, the superscript k of $\grave{h}^{(k)}$ identifies a result of the $k^{th}$ iteration, $B=A^H A$, A represents a sounding signal matrix, $b=A^H r$, r represents the near-field reflection signal, $w^{(k)}$ represents a weighting vector of the $k^{th}$ iteration, an initial value of the weighting vector is $w^{(0)}=\alpha 1_{M \times 1}$, $1_{M \times 1}$ represents an M×1-dimension column vector whose elements are all 1, M represents a multi-path delay distribution range of a near-field reflection channel, an operator "C" represents that elements corresponding to two vectors are multiplied, and κ, k, and α are preset positive integers used for adjusting a convergence property.

With reference to the seventh possible implementation manner, in an eighth possible implementation manner, $(B+\text{diag }\{w^{(k)}\})^{-1}$ is obtained by calculation through iteration from m=1 to m=M by using the following formula:

$$B_m^{-1} = D_{m-1} - \frac{w_m^{(k)}}{1 + w_m^{(k)} d_{m-1,mm}} d_{m-1,m} d_{m-1,m}^H, m = 1, 2, \Lambda, M$$

wherein $B_m=B_{m-1}+w_m^{(k)}e_m e_m^H$, $D_{m-1}=B_{m-1}^{-1}=[d_{m-1,1}, d_{m-1,2}, \Lambda, d_{m-1,M}]$, and especially, $B_0=B$, $B_M^{-1}=(B+\text{diag }\{w^{(k)}\})^{-1}$, $d_{m-1,m}$ is the $m^{th}$ column vector of a matrix $D_{m-1}$, $d_{m-1,mm}$ is an element in the $m^{th}$ row and $m^{th}$ column of the matrix $D_{m-1}$, and $e_i$ represents an M×1-dimension column vector in which the $i^{th}$-column elements are 1 and the other elements are all 0.

With reference to the third aspect or any one of the foregoing possible implementation manners, in a ninth possible implementation manner, before the determining, based on the near-field reflection channel parameter, a reconstructed near-field reflected self-interference signal, the method further includes: acquiring multiple near-field reflection channel parameters; and determining an average value of the multiple near-field reflection channel parameters, where the determining, based on the near-field reflection channel parameter, a reconstructed near-field reflected self-interference signal includes: determining the reconstructed near-field reflected self-interference signal according to the average value of the multiple near-field reflection channel parameters.

With reference to the third aspect or any one of the foregoing possible implementation manners, in a tenth possible implementation manner, a power used for sending the sounding signal is less than a power used for sending the first communication signal.

With reference to the third aspect or any one of the foregoing possible implementation manners, in an eleventh possible implementation manner, when the apparatus supports multiple-input multiple-output MIMO, the sending a sounding signal includes: sending the sounding signal separately by using multiple antennas of the apparatus, where timeslots used for sending the sounding signal by the multiple antennas are different.

With reference to the third aspect or any one of the foregoing possible implementation manners, in a twelfth possible implementation manner, a timeslot used for sending the sounding signal is different from a timeslot used for sending a sounding signal by an adjacent apparatus supporting wireless full duplex.

According to the method and apparatus provided in the embodiments of the present invention, a communications node, for example, user terminal or a base station, including the apparatus may send a sounding signal in a time division multiplexing manner when sending a data signal, and can effectively recognize a near-field reflection signal corresponding to the sounding signal, so as to determine a near-field reflection channel parameter according to the near-field reflection signal, and reduce a near-field reflected self-interference signal in a second communication signal according to the near-field reflection channel parameter.

BRIEF DESCRIPTION OF DRAWINGS

To describe the technical solutions in the embodiments of the present invention more clearly, the following briefly introduces the accompanying drawings required for describing the embodiments of the present invention. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

The following clearly describes the technical solutions in the embodiments of the present invention with reference to the accompanying drawings in the embodiments of the present invention. Apparently, the described embodiments are merely some but not all of the embodiments of the present invention. All other embodiments obtained by a person of ordinary skill in the art based on the embodiments of the present invention without creative efforts shall fall within the protection scope of the present invention.

It should be understood that, the technical solutions in the embodiments of the present invention may be applied to a wireless full duplex system. Communications nodes, such as user equipment and a base station, mentioned in the embodiments of the present invention all support a wireless full duplex system.

User equipment (User Equipment, UE), also referred to as a mobile terminal (Mobile Terminal, MT), mobile user equipment, and the like, may communicate with one or more core networks by using a radio access network (for example, Radio Access Network, RAN). The user equipment may be a mobile terminal, such as a mobile phone (also referred to as a "cellular" phone) and a computer with a mobile terminal. For example, the user equipment may be a portable, pocket-sized, handheld, computer built-in, or in-vehicle mobile apparatus.

Figure 1:
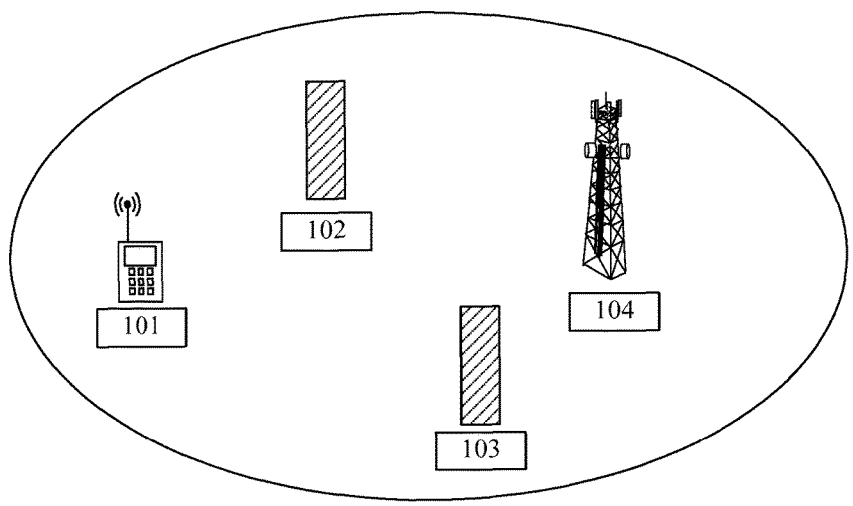
FIG. 1 is a schematic diagram of a communications system.

FIG. 1 is a schematic diagram of a communications system. Methods, shown in FIG. 2 and FIG. 3, for reducing a self-interference signal in a communications system may be executed by an apparatus, supporting wireless full duplex, in an apparatus 101 in FIG. 1. The communications system shown in FIG. 1 includes user equipment 101, a first reflector 102, a second reflector 103, and a base station 104, where the first reflector 102 and the second reflector 103 may be objects, for example, buildings, which can reflect a radio frequency signal. Generally, a distance from the first reflector 102 to the user equipment 101 may be any distance from 0.3 m to 60 m, and a distance from the second reflector 103 to the user equipment 101 may be any distance greater than 60 m.

The user equipment 101 communicates with the base station 104. Specifically, the user equipment 101 sends information to the base station 104 by using a first communication signal, and the base station 104 sends information to the user equipment 101 by using a second communication signal. The user equipment 101 may send a sounding signal used for estimating a near-field reflected self-interference signal. In other words, a radio frequency signal sent by the user equipment 101 includes the first communication signal that is used for communicating with the base station 104 and the sounding signal that is used for determining the near-field reflected self-interference signal.

In addition to receiving the second communication signal sent by the base station 104, the user equipment 101 also receives an echo signal reflected by a reflector. Specifically, the first reflector 102 may reflect, to the user equipment 101, the radio frequency signal sent by the user equipment 101. A signal reflected by the first reflector 102 is referred to as a near-field reflected self-interference signal, and a channel for transmitting the near-field reflected self-interference signal is referred to as a near-field reflection channel. The second reflector 103 may also reflect, to the user equipment 101, a signal sent by the user equipment 101. A signal reflected by the second reflector 103 is referred to as a far-field reflected self-interference signal, and a channel for transmitting the far-field reflected self-interference signal is referred to as a far-field reflection channel. The near-field reflected self-interference signal and the far-field reflected self-interference signal are generally referred to as echo signals.

It should be noted that, FIG. 1 shows only one first reflector and one second reflector. Actually, there may be multiple first reflectors having distances 0.3 m to 60 m from the user equipment 101, and multiple second reflectors having distances greater than 60 m from the user equipment 101. A signal generated when the radio frequency signal sent by the user equipment 101 is reflected by multiple first reflectors back to the user equipment 101 is also referred to as a near-field reflected self-interference signal. Similarly, a signal generated when the radio frequency signal sent by the user equipment 101 is reflected by multiple second reflectors back to the user equipment 101 is also referred to as a far-field reflected self-interference signal. In other words, the near-field reflected self-interference signal and the far-field reflected self-interference signal are not distinguished based on which reflector reflects a signal, and as long as a signal is reflected back by a reflector within a specific area, the signal can be referred to as a near-field reflected self-interference signal (a distance between the reflector and the user equipment is within 0.3 m to 60 m) or a far-field reflected self-interference signal (a distance between the reflector and the user equipment is greater than 60 m). In addition, the user equipment 101 and the base station 104 that are shown in FIG. 1 may also be other communications nodes supporting wireless full duplex.

It should be noted that, "first" and "second" in the first communication signal and the second communication signal in this specification of the present invention are only used for distinguishing different data, rather than limiting data and data content.

Figure 2:
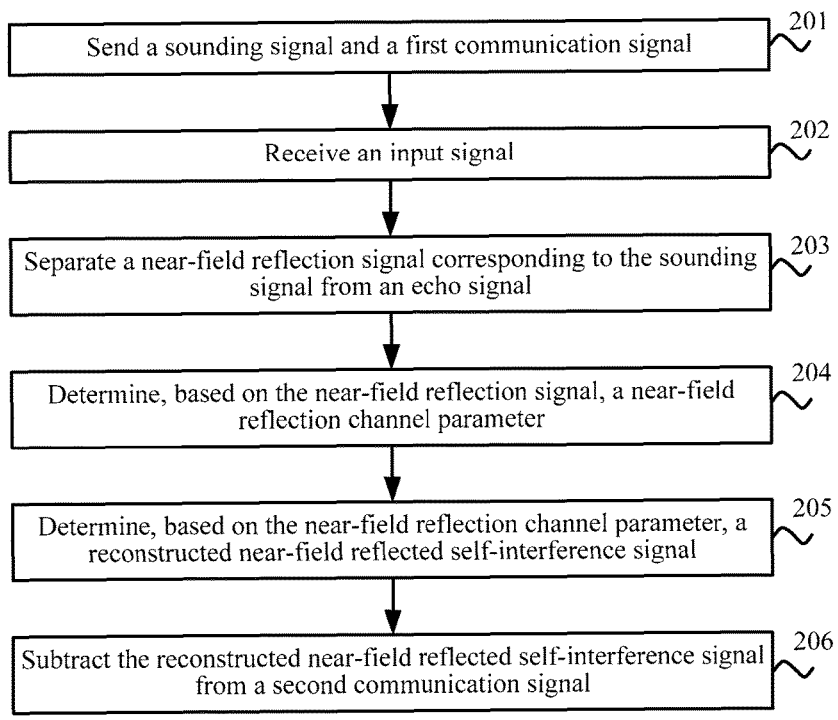
FIG. 2 is a schematic flowchart of a method for reducing a self-interference signal in a communications system according to an embodiment of the present invention.

FIG. 2 is a schematic flowchart of a method for reducing a self-interference signal in a communications system according to an embodiment of the present invention. The method shown in FIG. 2 is executed by an apparatus supporting wireless full duplex. The apparatus may be located in a communications node such as user equipment or a base station.

201: Send a sounding signal and a first communication signal, where a timeslot used for sending the sounding signal is different from a timeslot used for sending the first communication signal to another apparatus, and the sounding signal is a large time-bandwidth product signal.

202: Receive an input signal, where the input signal includes a second communication signal sent by another apparatus and an echo signal that corresponds to the sounding signal and the first communication signal.

203: Separate a near-field reflection signal corresponding to the sounding signal from the echo signal.

204: Determine, based on the near-field reflection signal, a near-field reflection channel parameter.

205: Determine, based on the near-field reflection channel parameter, a reconstructed near-field reflected self-interference signal.

206: Subtract the reconstructed near-field reflected self-interference signal from the second communication signal, where the second communication signal is sent by another apparatus.

According to the method shown in FIG. 2, a communications node, such as user equipment or a base station, including the apparatus may send a sounding signal in a time division multiplexing manner when sending a data signal, and can effectively recognize a near-field reflection signal corresponding to the sounding signal, so as to determine a near-field reflection channel parameter according to the near-field reflection signal, and reduce a near-field reflected self-interference signal in a second communication signal according to the near-field reflection channel parameter. The method shown in FIG. 2 can effectively estimate a near-field reflection channel, thereby achieving an objective of reducing a near-field reflected self-interference signal in self-interference.

Figure 3:
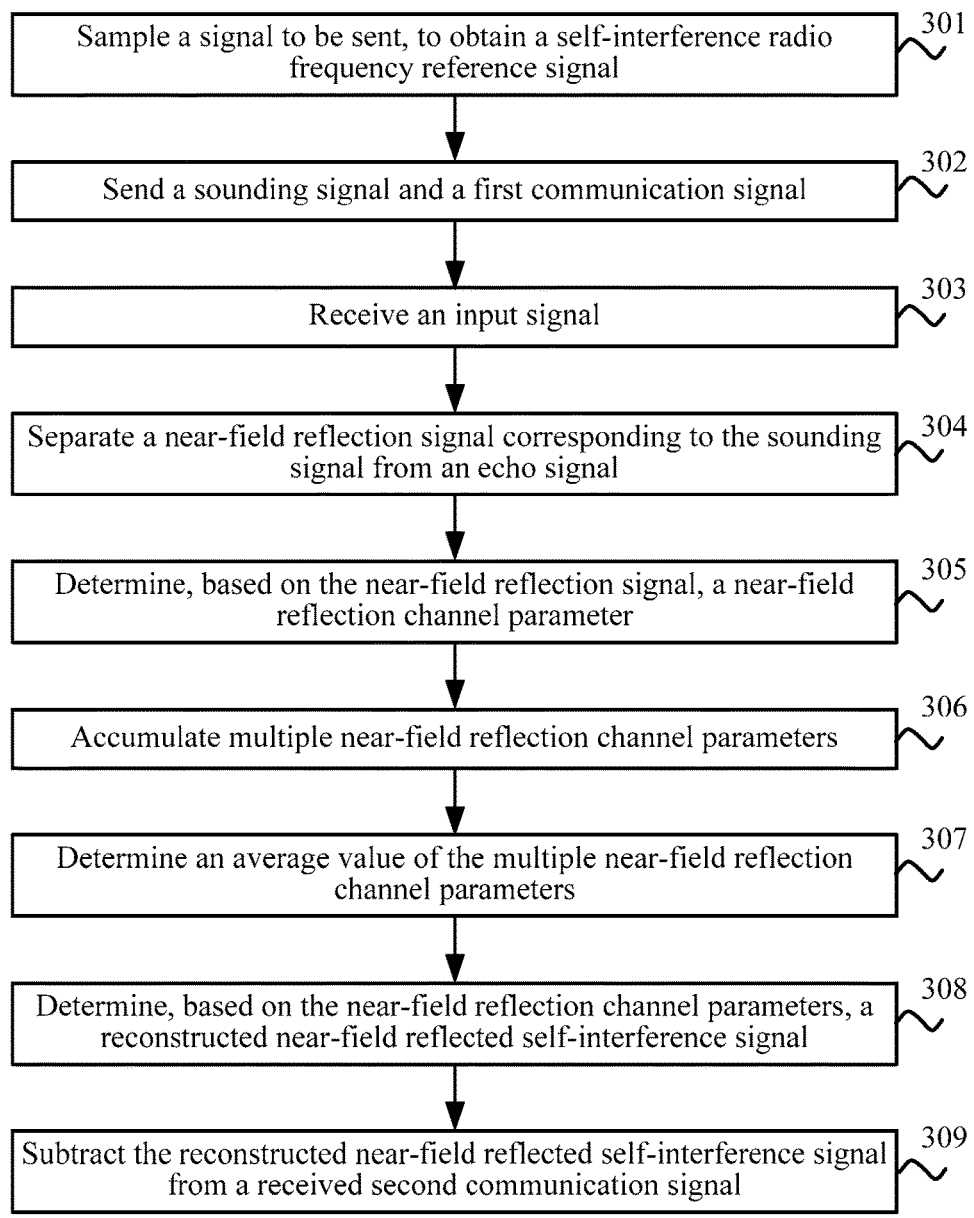
FIG. 3 is a schematic flowchart of a method for reducing a self-interference signal in a communications system according to an embodiment of the present invention.

FIG. 3 is a schematic flowchart of a method for reducing a self-interference signal in a communications system according to an embodiment of the present invention. The method shown in FIG. 3 is a specific embodiment of the method shown in FIG. 2. The method shown in FIG. 3 is executed by an apparatus supporting wireless full duplex. The apparatus may be located in a communications node such as user equipment or a base station.

301: Sample a signal to be sent, to obtain a self-interference radio frequency reference signal.

The signal to be sent includes a sounding signal and a first communication signal. Specifically, a communications node (first communications node for short below) that includes the apparatus supporting the wireless full duplex communicates with another communications node. A signal generated by the first communications node and used for communicating with another communications node is referred to as a first communication signal, and the first communication signal includes all information, such as data information and control information, used for communicating with another communications node. In addition to generating the first communication signal, the first communications node further generates a sounding signal, where the sounding signal is used for measuring a near-field reflection channel parameter. The first communications node combines the first communication signal and the sounding signal into one radio frequency signal in a time division multiplexing manner. In other words, the sounding signal and the first communication signal are staggered in a time domain. In addition, before the first communication signal and the sounding signal are combined into one radio frequency signal, the first communication signal and the sounding signal may also pass through different intermediate radio frequency channels (including digital-to-analog conversion, up-conversion, power amplification, and the like). Alternatively, after the first communication signal and the sounding signal are combined into one radio frequency signal, the radio frequency signal may pass through an intermediate radio frequency channel (including digital-to-analog conversion, up-conversion, power amplification, and the like). After this, the first communications node samples the radio frequency signal to be sent, to obtain a self-interference radio frequency reference signal.

302: Send a sounding signal and a first communication signal, where a timeslot used for sending the sounding signal is different from a timeslot used for sending the first communication signal, and the sounding signal is a large time-bandwidth product signal.

Because the first communications node combines the first communication signal and the sounding signal into one radio frequency signal in the time division multiplexing manner, the first communications node sends the first communication signal in a data transmission timeslot, sends the sounding signal in a transmit timeslot in a sounding timeslot, and stops sending the sounding signal in an idle timeslot in the sounding timeslot, where the idle timeslot includes a first silent timeslot $\delta_1$ and a second silent timeslot $\delta_2$. Specifically, the first communications node sends, in the transmit timeslot, a large time-bandwidth product signal with a bandwidth of B and a time length of T, where TB>>1, and the symbol ">>" indicates being greatly greater than. A typical large time-bandwidth product ("time-bandwidth product" for short below) signal used for the sounding signal may be linear frequency modulation, non-linear frequency modulation, or the like. Usually, to reduce out-of-band emission, the sounding signal may also be a large time-bandwidth product signal that is obtained after time-domain windowing, where a typical window function used for windowing may be a Hamming (Hamming) window, a Hanning (Hanning) window, a Tyler (Tyler) window, or the like. Then, the first communications node remains silent in the idle timeslot, and does not send any signal in this period, so that the first communications node can perform echo detection processing. Optionally, the first silent timeslot $\delta_1$ in the idle timeslot may be a maximum multi-path delay of a near-field reflection channel, and a value of the second silent timeslot $\delta_2$ in the idle timeslot enables a delay of an echo multi-path component to exceed a sum of duration of the first silent timeslot and duration of the second silent timeslot, where a power of the echo multi-path component is less than a preset threshold, so that the sounding signal does not cause interference to a sounding signal generated in a next sounding timeslot. Typically, $\delta_2 = 3\delta_1 \sim 4\delta_1$.

Optionally, the first communications node may send the first communication signal in the data transmission timeslot (that is, a timeslot structure shown in FIG. 4) when the first communications node sends the sounding signal in the transmit timeslot in the sounding timeslot and stops sending the sounding signal in the idle timeslot in the sounding timeslot one time. The first communications node may send the first communication signal in the data transmission timeslot (that is, a timeslot structure shown in FIG. 5) when the first communications node sends the sounding signal in the transmit timeslot in the sounding timeslot and stops sending the sounding signal in the idle timeslot in the sounding timeslot multiple times. In other words, a relationship between the sounding timeslot and the data transmission timeslot (that is, a manner of time division multiplexing on the sounding signal and the first communication signal) may be that: one data transmission timeslot exists after N sounding timeslots, or one data transmission timeslot exists after each sounding timeslot. When one data transmission timeslot exists after each sounding timeslot, and the data transmission timeslot is greatly greater than the sounding timeslot, a value of the second silent timeslot $\delta_2$ in the idle timeslot may be zero.

Figure 4:
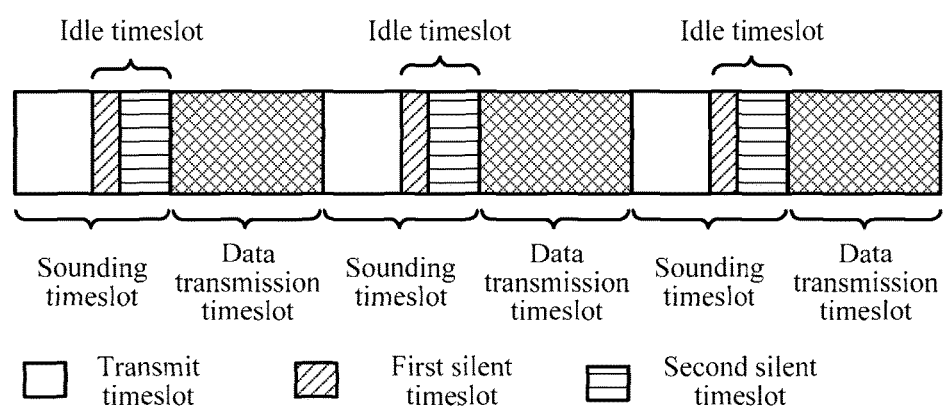
FIG. 4 is a structural diagram of a timeslot according to an embodiment of the present invention.

Because the sounding signal is only used for estimating a near-field reflection signal on the near-field reflection channel, $\delta_1 << T$. For example, a near-field reflection channel within a radius of 60 m of a transmitter is considered, and it may be that $\delta_1 = 400$ ns. When the timeslot structure shown in FIG. 4 is used, it may be that $\delta_2 = 1.6$ μs. Because a near-field channel changes slowly with the time, $T_2 >> T_1$, where $T_2$ represents duration of the data transmission timeslot, and $T_1$ represents duration of the sounding timeslot. Typically, $T_1 + T_2 = 10 \sim 100$ ms, and $T_1 = 3 \sim 10$ μs. Compared with a time of the data transmission timeslot used for data transmission, a time of a sounding timeslot used for probing a near-field reflection channel accounts for only a small proportion; therefore, impact on a capacity of a communications system can be ignored.

Optionally, in an embodiment, because when a bandwidth is larger, it is easier to recognize overlapped signals, a bandwidth used for sending the sounding signal is greater than a bandwidth used for sending the first communication signal, and therefore a near-field reflection channel having a relatively small multi-path delay difference can be recognized. For example, a bandwidth of a communication channel used for sending the first communication signal may be 20 MHz, and a bandwidth used for sending the sounding signal is B=80 MHz. In this case, a multi-path delay of 12 ns can be recognized. Therefore, although the bandwidth of the sounding signal is greater than the bandwidth of the first communication signal, the sounding signal and the first communication signal are located in a same frequency band, which can ensure that a wireless channel parameter measured by using the sounding signal approximates a channel parameter of the communication channel of the first communication signal.

For example, the communication channel used for sending the first communication signal is located within 2.4 GHz to 2.42 GHz, and a communication channel used for sending the sounding signal is located within 2.4 GHz to 2.48 GHz. A Hamming window non-linear frequency modulation signal whose time-bandwidth product is TB=120 is used as a sounding signal, where a signal bandwidth is B=80 MHz, the timeslot structure shown in FIG. 4 is used, T=1.5 μs, and $T_1 = 3.5$ μs. In this case, the first communication signal and the sounding signal are located in a same frequency band, but the bandwidth of the sounding signal is greater than that of the first communication signal.

Optionally, in another embodiment, the bandwidth used for sending the sounding signal is greater than or equal to the bandwidth used for sending the first communication signal, and the sounding signal and the first communication signal are located in a same frequency band. When the bandwidth used for sending the sounding signal is equal to the bandwidth used for sending the first communication signal, the wireless channel parameter measured by using the sounding signal is the same as the channel parameter of the communication channel. When the bandwidth used for sending the sounding signal is greater than the bandwidth used for sending the first communication signal, it can be ensured that the wireless channel parameter measured by using the sounding signal approximates the channel parameter of the communication channel.

For example, when the bandwidth used for sending the sounding signal is equal to the bandwidth used for sending the first communication signal, the bandwidth of the communication channel is 20 MHz, the communication channel is located within 2.44 GHz to 2.46 GHz, and a central frequency is 2.45 GHz. The sounding signal is located in the same frequency band, a linear frequency modulation signal whose time-bandwidth product is TB=80 is used, a bandwidth is B=20 MHz, a timeslot structure shown in FIG. 3 is used, T=4 μs, and it may be that $T_1 = 4.4$ μs. For another example, when the bandwidth used for sending the sounding signal is greater than the bandwidth used for sending the first communication signal, the bandwidth of the communication channel is 20 MHz, the communication channel is located within 2.44 GHz to 2.46 GHz, and a central frequency is 2.45 GHz. A Hamming window non-linear frequency modulation signal whose time-bandwidth product is TB=80 is used as a sounding signal, the communication channel is located within 2.43 GHz to 2.47 GHz, the bandwidth is B=40 MHz, the timeslot structure shown in FIG. 4 is used, T=2 μs, and it may be that $T_1$=4 μs.

Further, a power used for sending the sounding signal is less than a power used for sending the first communication signal. In this case, except for a full duplex communications node very close (several meters to tens of meters) to the user equipment, transmission of the sounding signal may not interfere with near-field reflection channel sounding and data transmission of another communications node.

Further, for an adjacent (for example, having a distance of several meters or tens of meters) apparatus supporting wireless full duplex, a transmit slot in which the sounding signal is sent is staggered with a transmit timeslot used for sending a sounding signal by the adjacent apparatus supporting the wireless full duplex. In other words, timeslots used for probing near-field reflection channels by adjacent communications nodes A and B are staggered, when either node sends the sounding signal and receives an echo signal, a transmitter of the other communications node is in a silent state and has a transmit power of zero. If timeslots used for probing near-field reflection channels by nodes are separated by an interval of $\delta_3$, where $\delta_3 \geq 0$, a value of the second silent timeslot $\delta_2$ in the sounding timeslot of the near-field reflection channel of each node enables a power of an echo multi-path component of a sounding signal whose delay exceeds $\delta_1+\delta_2+\delta_3$ to be low enough. Therefore, the echo multi-path component does not cause interference to subsequent detection that is performed on a near-field reflection echo signal in a sounding timeslot of a near-field reflection channel of another node.

Optionally, in an embodiment, when the apparatus supporting the wireless full duplex supports multiple-input multiple-output (Multiple-Input Multiple-Output, MIMO), multiple antennas of the apparatus are used to separately send the radio frequency signal, and the multiple antennas are used to separately receive an input signal, where transmit timeslots used for sending the sounding signal by the multiple antennas are staggered. That is, at any time point, only one branch (that is, an antenna) is used for sending a sounding signal and receiving an echo signal of the sounding signal, and in this way, branches do not interfere with each other. Therefore, all branches may share one sounding signal. Similarly, if sounding timeslots of near-field reflection channels of the branches are separated by an interval of $\delta_3$, where $\delta_3 \geq 0$, a value of the second silent timeslot $\delta_2$ in the sounding timeslot of the near-field reflection channel of each branch enables a power of an echo multi-path component of a sounding signal whose delay exceeds $\delta_1+\delta_2+\delta_3$ to be low enough. Therefore, the echo multi-path component does not interfere with subsequent detection that is performed on a near-field reflection echo signal in a sounding timeslot of a near-field reflection channel of another branch.

303: Receive an input signal, where the input signal includes a second communication signal sent by another apparatus and an echo signal that corresponds to the sounding signal and the first communication signal.

304: Separate a near-field reflection signal corresponding to the sounding signal from the echo signal.

Specifically, the first communications node receives the input signal, where the input signal includes the second communication signal and the echo signal that corresponds to the radio frequency signal sent by the first communications node, and the second communication signal is sent by another apparatus. After receiving the input signal, the first communications node may use the self-interference radio frequency reference signal, thereby reducing a main path self-interference signal in the input signal. The first communications node may separate the near-field reflection signal corresponding to the sounding signal from the echo signal.

305: Determine, based on the near-field reflection signal, a near-field reflection channel parameter.

Optionally, in an embodiment, when the bandwidth used for sending the sounding signal is greater than the bandwidth used for sending the first communication signal, matched filtering may be used to determine the near-field reflection channel parameter.

Optionally, in another embodiment, when the bandwidth used for sending the sounding signal is greater than or equal to the bandwidth used for sending the first communication signal, a super-resolution delay algorithm may be used to determine the near-field reflection channel parameter. Typically, the super-resolution delay algorithm includes: a maximum likelihood estimation algorithm, a high-resolution direction-of-arrival estimation algorithm based on array signal processing, matching pursuit, orthogonal matching pursuit, and the like.

Further, the super-resolution delay algorithm may further include a low-complexity super-resolution delay algorithm. Specifically, the near-field reflection channel parameter may be determined through iteration by using the following formulas:

$$\hat{h}^{(k)} = (B + \text{diag}\{w^{(k)}\})^{-1} b \qquad 1.1$$

$$w^{(k)} = \left[1 + \kappa - \frac{|\hat{h}^{(k-1)}|}{\max|\hat{h}^{(k-1)}|}\right] \circ w^{(k-1)} \qquad 1.2$$

where $\hat{h}^{(k)}$ represents the near-field reflection channel parameter, the superscript k of $\hat{h}^{(k)}$ represents a quantity of times of the $k^{th}$ iteration, $B=A^H A$, A represents a sounding signal matrix, $b=A^H r$, r represents the near-field reflection signal, $w^{(k)}$ represents a weighting vector of the $k^{th}$ iteration, an initial value of the weighting vector is $w^{(0)}=\alpha 1_{M\times 1}$, $1_{M\times 1}$ represents an M×1-dimension column vector whose elements are all 1, M represents a multi-path delay distribution range of a near-field reflection channel, an operator "∘" represents that elements corresponding to two vectors are multiplied, and κ, k, and a are preset positive integers used for adjusting a convergence property. Generally, when a quantity of iteration times is 20 to 30, the low-complexity super-resolution delay algorithm is convergent, and when a value of k may be 20 to 30, the low-complexity super-resolution delay algorithm is convergent. Further, if the M×M-dimension matrix B is a conjugate symmetric matrix (that is, $B=B^H$), $(B+\text{diag}\{w^{(k)}\})^{-1}$ may be obtained by calculation through iteration from m=1 to m=M by using the following formula:

$$B_m^{-1} = D_{m-1} - \frac{w_m^{(k)}}{1 + w_m^{(k)} d_{m-1,mm}} d_{m-1,m} d_{m-1,m}^H, \quad m = 1, 2, \Lambda, M \quad 1.3$$

wherein $B_m = B_{m-1} + w_m^{(k)} e_m e_m^H$, $D_{m-1} = B_{m-1}^{-1} = [d_{m-1,1}, d_{m-1,2}, \Lambda, d_{m-1,M}]$, and especially, $B_0 = B$, $B_M^{-1} = (B + \text{diag}\{w^{(k)}\})^{-1}$, $d_{m-1,m}$ is the m$^{th}$ column vector of a matrix $D_{m-1}$, $d_{m-1,mm}$ is an element in the m$^{th}$ row and m$^{th}$ column of the matrix $D_{m-1}$, and $e_i$ represents an M×1-dimension column vector in which the i$^{th}$-column elements are 1 and the other elements are all 0. In other words, $B^{-1} = (A^H A)^{-1}$ is calculated in advance, inverse matrices of matrices $B + w_1^{(k)} e_1 e_1^H$, $(B + w_1^{(k)} e_1 e_1^H) + w_2^{(k)} e_2 e_2^H$, ..., $$\left(B + \sum_{i=1}^{M-1} w_i^{(k)} e_i e_i^H\right) + w_M^{(k)} e_M e_M^H$$

are calculated through M iterations, so as to obtain an inverse matrix of $B + \text{diag}\{w^{(k)}\}$.

306: Accumulate multiple near-field reflection channel parameters.

307: Determine an average value of the multiple near-field reflection channel parameters.

It should be noted that, step 306 and step 307 are optional steps. Because the near-field reflection channel changes slowly, and in sounding timeslots of multiple adjacent near-field reflection channels, the near-field reflection channels approximate to each other, a method of performing coherent accumulation on multiple timeslots may be used, thereby further reducing a requirement on a signal-to-noise ratio of the near-field reflection channel parameter. For example, when the timeslot structure shown in FIG. 4 is used, N (N is a positive integer greater than or equal to 1) sounding timeslots of the near-field reflection channel are sent continuously each time, an echo signal received in each timeslot is processed, the near-field reflection channel parameter corresponding to the near-field reflection signal is determined, and after buffering, the near-field reflection channel parameter is added to a near-field reflection channel parameter that is obtained by calculating an echo signal received in a next timeslot, and near-field reflection channel parameters in N timeslots are accumulated and then averaged, to obtain a near-field reflection channel parameter obtained after coherent integration.

308: Determine, based on the near-field reflection channel parameter, a reconstructed near-field reflected self-interference signal.

Specifically, the reconstructed near-field reflected self-interference signal may be determined by using the following formula:

$$y(t) = x(t) * h(t) \quad 1.4$$

where y(t) represents the reconstructed near-field reflected self-interference signal, x(t) represents a reconstructed reference signal, h(t) represents a near-field reflection channel parameter, and a symbol "*" represents convolution. Optionally, the reconstructed reference signal may be the first communication signal, or may be the self-interference radio frequency reference signal. In other words, the reconstructed near-field reflected self-interference signal may be determined according to the near-field reflection channel parameter and the first communication signal, or the reconstructed near-field reflected self-interference signal may be determined according to the near-field reflection channel parameter and the self-interference radio frequency reference signal.

309: Subtract the reconstructed near-field reflected self-interference signal from the received second communication signal, where the second communication signal is sent by another apparatus.

Optionally, in an embodiment, the first communications node may subtract, from the received second communication signal, the reconstructed near-field reflected self-interference signal that is determined according to the near-field reflection channel parameter and the first communication signal.

Optionally, in another embodiment, the first communications node may subtract, from the received second communication signal, the reconstructed near-field reflected self-interference signal that is determined according to the near-field reflection channel parameter and the self-interference radio frequency reference signal.

When step 306 and step 307 are performed, optionally, in an embodiment, the first communications node may determine the reconstructed near-field reflected self-interference signal according to an average value of multiple near-field reflection channel parameters and the self-interference radio frequency reference signal, and subtract the reconstructed near-field reflected self-interference signal from the received second communication signal. Alternatively, in another embodiment, the first communications node may determine the reconstructed near-field reflected self-interference signal according to the average value of the multiple near-field reflection channel parameters and the first communication signal, and subtract the reconstructed near-field reflected self-interference signal from the received second communication signal.

In addition, when the apparatus supporting the wireless full duplex supports MIMO, each receive branch not only include a near-field reflected self-interference signal from respective transmit branches, but also includes a near-field reflected self-interference signal from another branch. Therefore, for an MIMO system having M (M is a positive integer greater than or equal to 2) transmit branches, each branch needs to separately estimate self-interference channels from M transmit branches, so as to reconstruct a corresponding self-interference signal component corresponding to each transmit branch, thereby effectively canceling the near-field reflected self-interference signal from the received signal.

According to the method shown in FIG. 3, a communications node, for example, user equipment or a base station, including the apparatus may send a sounding signal in a time division multiplexing manner when sending a data signal, and can effectively recognize a near-field reflection signal corresponding to the sounding signal, and therefore, can determine a near-field reflection channel parameter according to the near-field reflection signal, determine a reconstructed near-field reflected self-interference signal according to the near-field reflection channel parameter, and subtract the reconstructed near-field reflected self-interference signal from a second communication signal. By using the method shown in FIG. 3, a near-field reflection signal can be effectively recognized and reconstructed, and a near-field reflected self-interference signal in self-interference of a received signal can be canceled.

FIG. 4 is a structural diagram of a timeslot according to an embodiment of the present invention. In this case, a sounding timeslot alternates with a data transmission timeslot.

Figure 5:
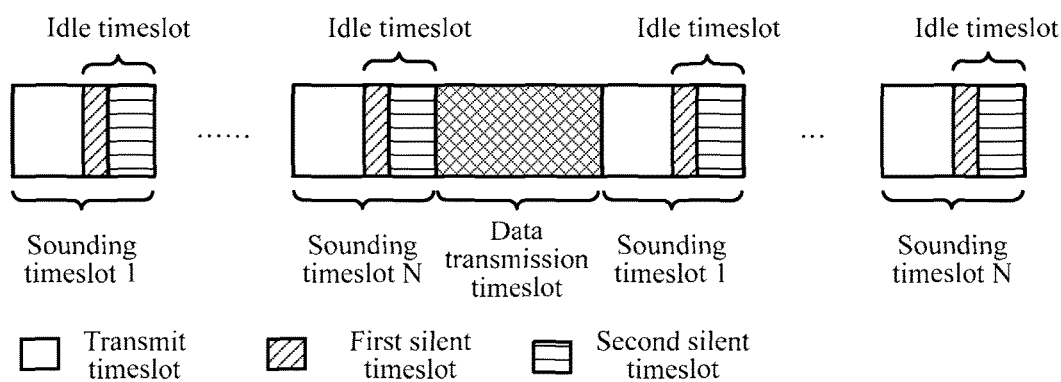
FIG. 5 is a structural diagram of another timeslot according to an embodiment of the present invention.

FIG. 5 is a structural diagram of another timeslot according to an embodiment of the present invention. In this case, N continuous sounding timeslots alternate with one data transmission timeslot, where N is a positive integer greater than or equal to 2.

Figure 6:
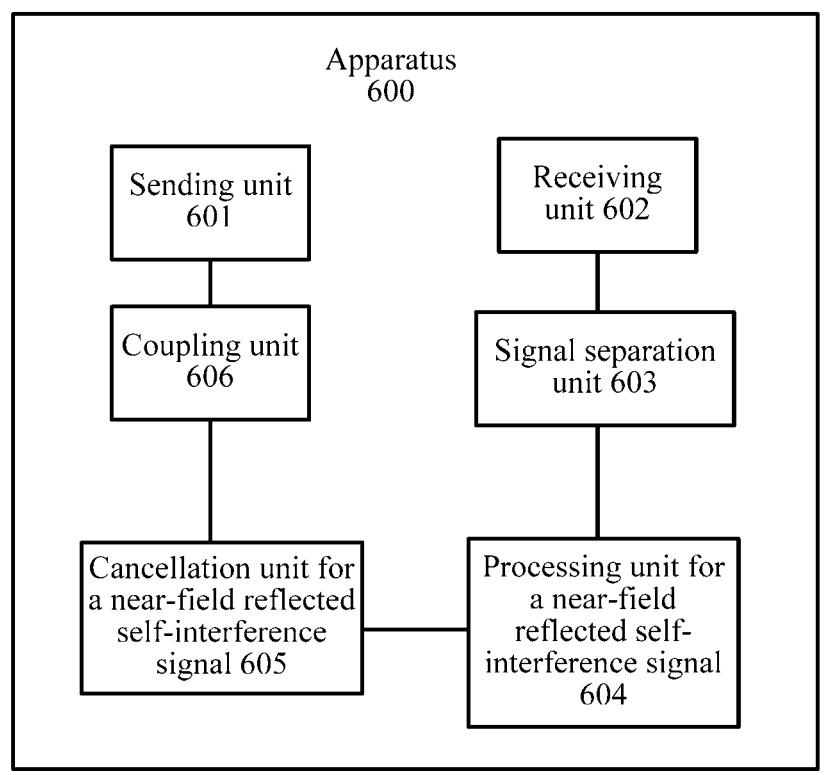
FIG. 6 is a structural block diagram of an apparatus according to an embodiment of the present invention.

FIG. 6 is a structural block diagram of an apparatus according to an embodiment of the present invention. The apparatus shown in FIG. 6 supports a wireless full duplex system. The apparatus may be located in a communications node such as user equipment or a base station. The apparatus 600 shown in FIG. 6 includes a sending unit 601, a receiving unit 602, a signal separation unit 603, a processing unit 604 for a near-field reflected self-interference signal, and a cancellation unit 605 for a near-field reflected self-interference signal.

The sending unit 601 is configured to send a sounding signal and a first communication signal, where a timeslot used for sending the sounding signal by the sending unit 601 is different from a timeslot used for sending the first communication signal, and the sounding signal is a large time-bandwidth product signal.

The receiving unit 602 is configured to receive an input signal, where the input signal includes a second communication signal sent by another apparatus and an echo signal that corresponds to the sounding signal and the first communication signal that are sent by the sending unit 601.

The signal separation unit 603 is configured to separate a near-field reflection signal corresponding to the sounding signal from the echo signal.

The processing unit 604 for a near-field reflected self-interference signal is configured to determine, based on the near-field reflection signal, a near-field reflection channel parameter.

The cancellation unit 605 for a near-field reflected self-interference signal is configured to determine, based on the near-field reflection channel parameter, a reconstructed near-field reflected self-interference signal, and subtract the reconstructed near-field reflected self-interference signal from the second communication signal.

The apparatus 600 shown in FIG. 6 sends a sounding signal in a time division multiplexing manner when sending a data signal, and can effectively recognize and reconstruct a near-field reflection signal, thereby achieving an objective of effectively reducing self-interference from a near-field reflection signal.

Optionally, in an embodiment, the sending unit 601 may be specifically configured to send the sounding signal by using a bandwidth greater than a bandwidth used for sending the first communication signal. In this case, the processing unit 604 for a near-field reflected self-interference signal is specifically configured to perform matched filtering on the near-field reflection signal, to obtain a filtered near-field reflection signal, and determine the near-field reflection channel parameter according to the filtered near-field reflection signal.

Optionally, in another embodiment, the sending unit 601 may be specifically configured to send the sounding signal by using a bandwidth greater than or equal to a bandwidth used for sending the first communication signal. In this case, the processing unit 604 for a near-field reflected self-interference signal may be specifically configured to determine, by using a super-resolution delay algorithm, the near-field reflection channel parameter corresponding to the near-field reflection signal, where the super-resolution delay algorithm may be a maximum likelihood estimation algorithm, a high-resolution direction-of-arrival estimation algorithm based on array signal processing, matching pursuit, orthogonal matching pursuit, or the like.

Further, the super-resolution delay algorithm may further include a low-complexity super-resolution delay algorithm. For a specific process, refer to description of the method, and no further details are provided herein again.

Optionally, in an embodiment, the cancellation unit 605 for a near-field reflected self-interference signal is specifically configured to determine a timeslot corresponding to a second data signal, determine, in the timeslot corresponding to the second data signal and according to the near-field reflection channel parameter and the first communication signal, the reconstructed near-field reflected self-interference signal, and subtract the reconstructed near-field reflected self-interference signal from the second communication signal.

Optionally, in another embodiment, the processing unit 604 for a near-field reflected self-interference signal may be further configured to accumulate multiple near-field reflection channel parameters, and determine an average value of the multiple near-field reflection channel parameters. The cancellation unit 605 for a near-field reflected self-interference signal is specifically configured to determine a timeslot corresponding to a second data signal, determine, in the timeslot corresponding to the second data signal and according to the average value of the multiple near-field reflection channel parameters and the first communication signal, the reconstructed near-field reflected self-interference signal, and subtract the reconstructed near-field reflected self-interference signal from the second communication signal.

Optionally, in an embodiment, the apparatus 600 may further include a coupling unit 606, configured to sample a signal to be sent, to obtain a self-interference radio frequency reference signal, where the signal to be sent includes the sounding signal and the first communication signal. Specifically, the sounding signal and the first communication signal are combined into one radio frequency signal in a time division multiplexing manner. The sounding signal and the first communication signal that are sent by the sending unit 601 are the radio frequency signal, that is, the combined sounding signal and first communication signal. A specific relationship among the sounding signal, the first communication signal, and the radio frequency signal has been described specifically in the foregoing context, and no further details are provided herein again.

When the apparatus 600 includes the coupling unit 606, in an embodiment, the cancellation unit 605 for a near-field reflected self-interference signal is specifically configured to determine a timeslot corresponding to a second data signal, determine, in the timeslot corresponding to the second data signal and according to the near-field reflection channel parameter and the self-interference radio frequency reference signal, the reconstructed near-field reflected self-interference signal, and subtract the reconstructed near-field reflected self-interference signal from the second communication signal.

When the apparatus 600 includes the coupling unit 606, in another embodiment, the processing unit 604 for a near-field reflected self-interference signal may be further configured to accumulate multiple near-field reflection channel parameters, and determine an average value of the multiple near-field reflection channel parameters. The cancellation unit 605 for a near-field reflected self-interference signal is specifically configured to determine a timeslot corresponding to a second data signal, determine, in the timeslot corresponding to the second data signal and according to the average value of the multiple near-field reflection channel parameters and the self-interference radio frequency reference signal, the reconstructed near-field reflected self-interference signal, and subtract the reconstructed near-field reflected self-interference signal from the second communication signal.

Further, the cancellation unit 605 for a near-field reflected self-interference signal starts working in the timeslot of the second data signal, and stops working in other timeslots.

Optionally, in an embodiment, when the apparatus 600 supports multiple-input multiple-output, the sending unit 601 is specifically configured to send the radio frequency signal separately by using multiple antennas. The receiving unit 602 is specifically configured to receive the input signal separately by using the multiple antennas, where timeslots used for sending the sounding signal by the multiple antennas are staggered.

Optionally, in an embodiment, the sending unit 601 is specifically configured to send the radio frequency signal by using a timeslot that is staggered with a timeslot used for sending a radio frequency signal by an adjacent apparatus supporting the wireless full duplex.

Figure 7:
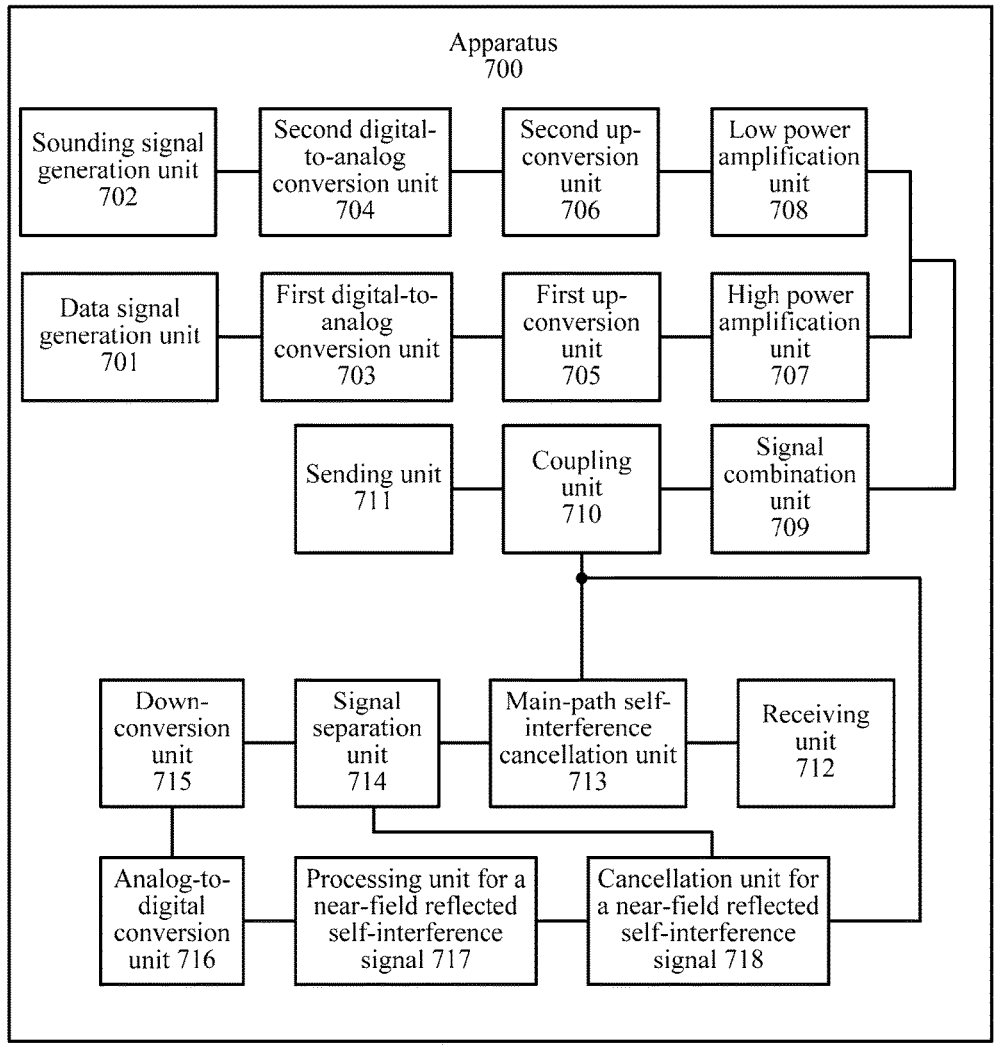
FIG. 7 is a structural block diagram of an apparatus according to an embodiment of the present invention.

FIG. 7 is a structural block diagram of an apparatus according to an embodiment of the present invention. The apparatus 700 shown in FIG. 7 is a specific embodiment of the apparatus 600 shown in FIG. 6. The embodiment shown in FIG. 7 is an embodiment in which a bandwidth used for sending a sounding signal is greater than a bandwidth used for sending a first communication signal, and a near-field reflection channel parameter is determined by using a matched filtering method. As shown in FIG. 7, the apparatus 700 includes: a data signal generating unit 701, a sounding signal generating unit 702, a first digital-to-analog conversion unit 703, a second digital-to-analog conversion unit 704, a first up-conversion unit 705, a second up-conversion unit 706, a high power amplification unit 707, a low power amplification unit 708, a signal combination unit 709, a coupling unit 710, a sending unit 711, a receiving unit 712, a main-path self-interference cancellation unit 713, a signal separation unit 714, a down-conversion unit 715, an analog-to-digital conversion unit 716, a processing unit 717 for a near-field reflected self-interference signal, and a cancellation unit 718 for a near-field reflected self-interference signal.

The data signal generating unit 701 is configured to generate a first communication signal. The sounding signal generating unit 702 is configured to generate a sounding signal. Because the sounding signal and a data signal have different bandwidths, different intermediate radio frequency channels need to be used. An intermediate radio frequency channel corresponding to the first communication signal includes the first digital-to-analog conversion unit 703, the first up-conversion unit 705, and the high power amplification unit 707. An intermediate radio frequency channel corresponding to the sounding signal includes the second digital-to-analog conversion unit 704, the second up-conversion unit 706, and the low power amplification unit 708. Because a transmit power of the sounding signal is greatly less than a transmit power of the data signal, a power amplifier used in the intermediate radio frequency channel corresponding to the first communication signal is a high power amplifier having a relatively high output power, and a power amplifier used in the intermediate radio frequency channel corresponding to the sounding signal is a low power amplifier having a relatively low power. After the first communication signal and the sounding signal separately pass through corresponding intermediate radio frequency channels, the signal combination unit 709 combines the first communication signal and the sounding signal into one radio frequency signal in a time division multiplexing manner. A specific combination method and a timeslot structure of the radio frequency signal have been described in the foregoing, and no further details are provided herein again. The radio frequency signal passes through the coupling unit 710, and the coupling unit 710 is configured to sample a signal to be sent, to obtain a self-interference radio frequency reference signal. Then, the sending unit 711 is configured to send the radio frequency signal. Further, if one antenna is shared for transmission and reception, the apparatus 700 further needs to include a circulator unit (not shown in the figure). After passing through the coupling unit 710 and the circulator unit, the radio frequency signal is sent by the sending unit 711, where the circulator unit is configured to isolate reception and transmission when one antenna is shared for reception and transmission. If different antennas are separately used for transmission and reception, the radio frequency signal does not need to pass through the circulator unit.

An input signal (including a second data signal and an echo signal that corresponds to the radio frequency signal) received by the receiving unit 712 needs to pass through the main-path self-interference cancellation unit 713. The main-path self-interference cancellation unit 713 does not distinguish a sounding timeslot and a data transmission timeslot of a near-field reflection channel, and performs main-path self-interference signal cancellation processing on all signals according to the self-interference radio frequency reference signal obtained by the coupling unit 710. After a low noise amplification unit (not shown in the figure) amplifies an input signal that is obtained after the main-path self-interference signal is canceled, the signal separation unit 714 separates the sounding timeslot and a transmit timeslot of the second communication signal, where the second communication signal is received from another apparatus. A near-field reflection signal that is received in the sounding timeslot of the near-field reflection channel and corresponds to the sounding signal is converted by the down-conversion unit 715 and the analog-to-digital conversion unit 716 into a baseband signal, and then, is processed by the processing unit 717 for a near-field reflected self-interference signal to generate a near-field reflection channel parameter. Specifically, the processing unit 717 for a near-field reflected self-interference signal generates the near-field reflection channel parameter by using a matched filtering method. Further, the processing unit 717 for a near-field reflected self-interference signal may further accumulate multiple near-field reflection channel parameters, and obtain an average value of the multiple near-field reflection channel parameters. The second communication signal received in the transmit timeslot of the second communication signal first passes through the cancellation unit 718 for a near-field reflected self-interference signal for cancellation of the near-field reflected self-interference signal, then is converted by the down-conversion unit and the analog-to-digital conversion unit into a baseband, and further passes through a cancellation unit for a far-field reflected self-interference signal (not shown in the figure) for cancellation of a far-field reflected self-interference signal, to obtain a data signal in which a self-interference signal has been canceled. The cancellation unit 718 for a near-field reflected self-interference signal specifically determines a reconstructed near-field reflected self-interference signal by using the near-field reflection channel parameter (or an average value of multiple near-field reflection channel parameters) provided by the processing unit 717 for a near-field reflected self-interference signal and the self-interference radio frequency reference signal provided by the coupling unit 710, and subtracts the reconstructed near-field reflected self-interference signal from the second communication signal.

Figure 8:
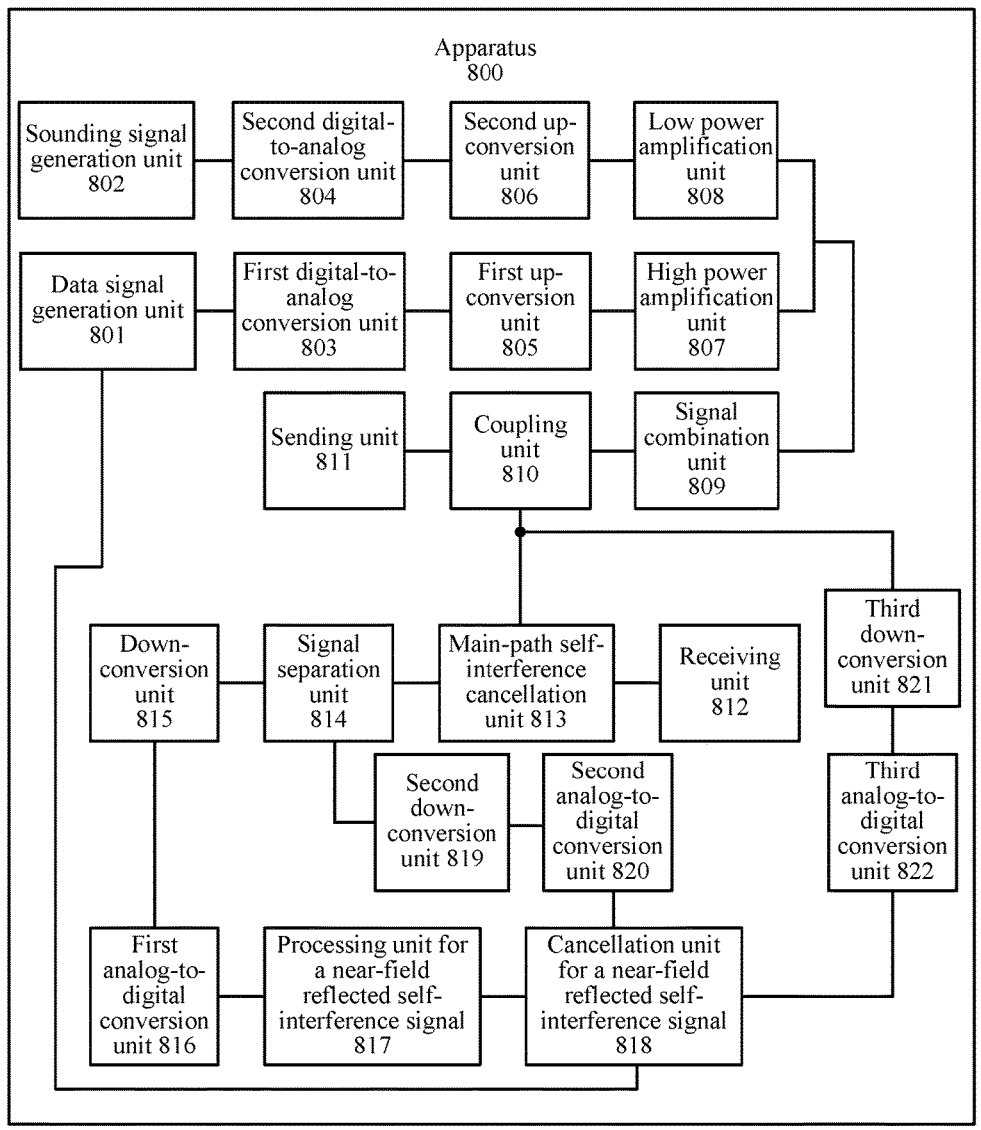
FIG. 8 is a structural block diagram of an apparatus according to an embodiment of the present invention.

FIG. 8 is a structural block diagram of an apparatus according to an embodiment of the present invention. The apparatus 800 shown in FIG. 8 is a specific embodiment of the apparatus 600 shown in FIG. 6. The embodiment shown in FIG. 8 is another embodiment in which a bandwidth used for sending a sounding signal is greater than a bandwidth used for sending a first communication signal, and a near-field reflection channel parameter is determined by using a matched filtering method. The apparatus 800 shown in FIG. 8 may be applied when an analog-to-digital conversion unit of a receiver has a relatively large dynamic range (for example, greater than 14 bits), or has a relatively low transmit power (for example, less than 20 dBm). As shown in FIG. 8, the apparatus 800 includes: a data signal generating unit 801, a sounding signal generating unit 802, a first digital-to-analog conversion unit 803, a second digital-to-analog conversion unit 804, a first up-conversion unit 805, a second up-conversion unit 806, a high power amplification unit 807, a low power amplification unit 808, a signal combination unit 809, a coupling unit 810, a sending unit 811, a receiving unit 812, a main-path self-interference cancellation unit 813, a signal separation unit 814, a first down-conversion unit 815, a first analog-to-digital conversion unit 816, a processing unit 817 for a near-field reflected self-interference signal, a cancellation unit 818 for a near-field reflected self-interference signal, a second down-conversion unit 819, and a second analog-to-digital conversion unit 820.

The data signal generating unit 801 is configured to generate a first communication signal. The sounding signal generating unit 802 is configured to generate a sounding signal. Because the sounding signal and a data signal have different bandwidths, different intermediate radio frequency channels need to be used. An intermediate radio frequency channel corresponding to the first communication signal includes the first digital-to-analog conversion unit 803, the first up-conversion unit 805, and the high power amplification unit 807. An intermediate radio frequency channel corresponding to the sounding signal includes the second digital-to-analog conversion unit 804, the second up-conversion unit 806, and the low power amplification unit 808. Because a transmit power of the sounding signal is greatly less than a transmit power of the data signal, a power amplifier used in the intermediate radio frequency channel corresponding to the first communication signal is a high power amplifier having a relatively high output power, and a power amplifier used in the intermediate radio frequency channel corresponding to the sounding signal is a low power amplifier having a relatively low power. After the first communication signal and the sounding signal separately pass through corresponding intermediate radio frequency channels, the signal combination unit 809 combines the first communication signal and the sounding signal into one radio frequency signal in a time division multiplexing manner. A specific combination method and a timeslot structure of the radio frequency signal have been described in the foregoing, and no further details are provided herein again. The radio frequency signal passes through the coupling unit 810, and the coupling unit 810 is configured to sample a signal to be sent, to obtain a self-interference radio frequency reference signal. Then, the sending unit 811 is configured to send the radio frequency signal. Further, if one antenna is shared for transmission and reception, the apparatus 800 further needs to include a circulator unit (not shown in the figure). After passing through the coupling unit 810 and the circulator unit, the radio frequency signal is sent by the sending unit 811, where the circulator unit is configured to isolate reception and transmission in a case one antenna in which is shared for reception and transmission. If different antennas are separately used for transmission and reception, the radio frequency signal does not need to pass through the circulator unit.

An input signal (including a second data signal and an echo signal that corresponds to the radio frequency signal) received by the receiving unit 812 needs to pass through the main-path self-interference cancellation unit 813. The main-path self-interference cancellation unit 813 does not distinguish a sounding timeslot and a data transmission timeslot of a near-field reflection channel, and performs main-path self-interference signal cancellation processing on all signals according to the self-interference radio frequency reference signal obtained by the coupling unit 810. After a low noise amplification unit (not shown in the figure) amplifies an input signal that is obtained after the main-path self-interference signal is canceled, the signal separation unit 814 separates the sounding timeslot and a transmit timeslot of the second communication signal, where the second communication signal is received from another apparatus. A near-field reflection signal that is received in the sounding timeslot of the near-field reflection channel and corresponds to the sounding signal is converted by the first down-conversion unit 815 and the first analog-to-digital conversion unit 816 into a baseband signal, and is processed by the processing unit 817 for a near-field reflected self-interference signal to generate a near-field reflection channel parameter. Specifically, the processing unit 817 for a near-field reflected self-interference signal generates the near-field reflection channel parameter by using a matched filtering method. Further, the processing unit 817 for a near-field reflected self-interference signal may further accumulate multiple near-field reflection channel parameters, and obtain an average value of the multiple near-field reflection channel parameters.

When the analog-to-digital conversion unit of the receiver has a relatively large dynamic range (for example, greater than 14 bits), or has a relatively low transmit power (for example, less than 20 dBm), the near-field reflected self-interference signal may also be canceled at the baseband. In this case, the second communication signal received in the transmit timeslot of the second communication signal first is converted by the second down-conversion unit 819 and the second analog-to-digital conversion unit 820, then is input to the baseband, and then passes through the cancellation unit 818 for a near-field reflected self-interference signal for reduction of the near-field reflected self-interference signal. The cancellation unit 818 for a near-field reflected self-interference signal may use a structure based on a digital filter unit.

Optionally, in an embodiment, the cancellation unit 818 for a near-field reflected self-interference signal may determine the reconstructed near-field reflected self-interference signal according to the first communication signal generated by the data signal generating unit 801 and a near-field reflection channel parameter (or an average value of multiple near-field reflection channel parameters) provided by the processing unit 817 for a near-field reflected self-interference signal. Then, the cancellation unit 818 for a near-field reflected self-interference signal directly subtracts the reconstructed near-field reflected self-interference signal from the second communication signal, so as to reduce the near-field reflected self-interference signal in the second communication signal that is input to the baseband after conversion.

Optionally, in another embodiment, the cancellation unit 818 for a near-field reflected self-interference signal may reconstruct the near-field reflected self-interference signal according to the self-interference radio frequency reference signal and near-field reflection that are obtained by the coupling unit 810 and the near-field reflection channel parameter (or the average value of the multiple near-field reflection channel parameters). In this case, the apparatus 800 may further include a third down-conversion unit 821 and a third analog-to-digital conversion unit 822. In this way, the self-interference radio frequency reference signal is converted by the third down-conversion unit 821 and the third analog-to-digital conversion unit 822. The cancellation unit 818 for a near-field reflected self-interference signal determines the reconstructed near-field reflected self-interference signal by using the near-field reflection channel parameter (or the average value of the multiple near-field reflection channel parameters) and the converted self-interference radio frequency reference signal. Then, the cancellation unit 818 for a near-field reflected self-interference signal directly subtracts the reconstructed near-field reflected self-interference signal from the second communication signal, so as to reduce the near-field reflected self-interference signal in the second communication signal.

Figure 9:
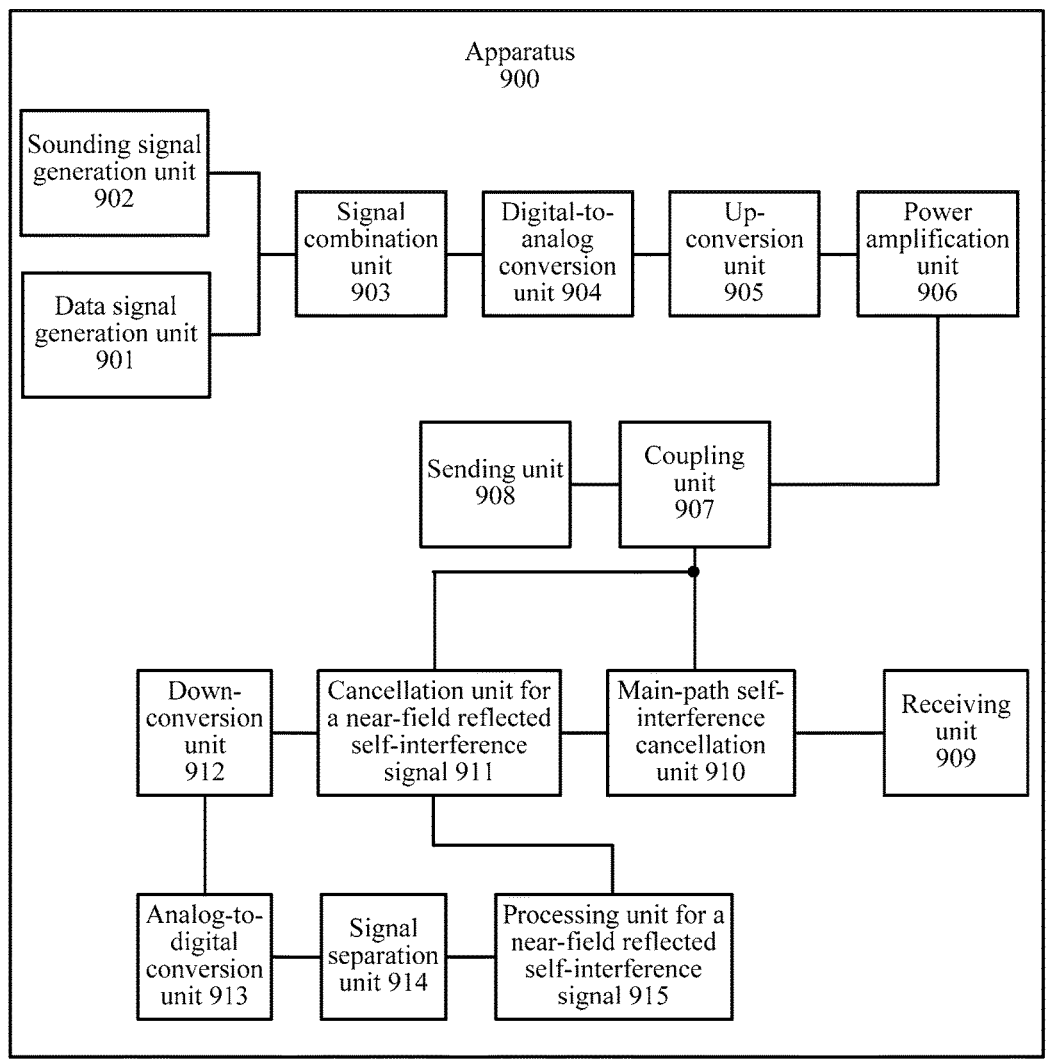
FIG. 9 is a structural block diagram of an apparatus according to an embodiment of the present invention.

FIG. 9 is a structural block diagram of an apparatus according to an embodiment of the present invention. The apparatus 900 shown in FIG. 9 is a specific embodiment of the apparatus 600 shown in FIG. 6. The embodiment shown in FIG. 9 is an embodiment in which a bandwidth used for sending a sounding signal is greater than or equal to a bandwidth used for sending a first communication signal, and a super-resolution delay algorithm or a low-complexity super-resolution delay algorithm is used. As shown in FIG. 9, the apparatus 900 includes: a data signal generating unit 901, a sounding signal generating unit 902, a signal combination unit 903, a digital-to-analog conversion unit 904, an up-conversion unit 905, a power amplification unit 906, a coupling unit 907, a sending unit 908, a receiving unit 909, a main-path self-interference cancellation unit 910, a cancellation unit 911 for a near-field reflected self-interference signal, a down-conversion unit 912, an analog-to-digital conversion unit 913, a signal separation unit 914, and a processing unit 915 for a near-field reflected self-interference signal.

The data signal generating unit 901 is configured to generate a first communication signal. The sounding signal generating unit 902 is configured to generate a sounding signal. A bandwidth of the sounding signal is greater than or equal to a bandwidth of the first communication signal. The signal combination unit 903 combines the sounding signal and the first communication signal into one radio frequency signal in a time division multiplexing manner. A specific combination method and a timeslot structure of the radio frequency signal have been described in the foregoing, and no further details are provided herein again. The coupling unit 907 samples a radio frequency signal passing through an intermediate radio frequency channel, to obtain a self-interference radio frequency reference signal, where the intermediate radio frequency channel includes the digital-to-analog conversion unit 904, the up-conversion unit 905, and the power amplification unit 906. Then, the sending unit 908 is configured to send the radio frequency signal. Further, if one antenna is shared for transmission and reception, the apparatus 900 further needs to include a circulator unit (not shown in the figure). After passing through the coupling unit 907 and the circulator unit, the radio frequency signal is sent by the sending unit 908, where the circulator unit is configured to isolate reception and transmission in a case one antenna in which is shared for reception and transmission. If different antennas are separately used for transmission and reception, the radio frequency signal does not need to pass through the circulator unit.

An input signal (including a second data signal and an echo signal that corresponds to the radio frequency signal) received by the receiving unit 909 needs to pass through the main-path self-interference cancellation unit 910. The main-path self-interference cancellation unit 910 does not distinguish a sounding timeslot and a data transmission timeslot of a near-field reflection channel, and performs main-path self-interference signal cancellation processing on all signals according to the self-interference radio frequency reference signal obtained by the coupling unit 907. A low noise amplification unit (not shown in the figure) amplifies the input signal in which a main-path self-interference signal is canceled. Then, the input signal passes through the cancellation unit 910 for a near-field reflected self-interference signal, and then is converted by the down-conversion unit 912 and the analog-to-digital conversion unit 913 into a baseband. The cancellation unit 910 for a near-field reflected self-interference signal is configured to reduce a near-field reflected self-interference signal in the second communication signal, where the second communication signal is received from another apparatus. The cancellation unit 910 for a near-field reflected self-interference signal only works in the transmit timeslot of the second communication signal, and does not work in a sounding timeslot. After the input signal is converted into a baseband, the signal separation unit 914 separates the sounding timeslot and the transmit timeslot of the second communication signal. The processing unit 915 for a near-field reflected self-interference signal generates a near-field reflection channel parameter by using a super-resolution delay algorithm or a low-complexity super-resolution delay algorithm. Further, the processing unit 915 for a near-field reflected self-interference signal may further accumulate multiple near-field reflection channel parameters, and obtain an average value of the multiple near-field reflection channel parameters. The cancellation unit 911 for a near-field reflected self-interference signal determines the reconstructed near-field reflected self-interference signal by using the near-field reflection channel parameter or the average value of the multiple near-field reflection channel parameters and the self-interference radio frequency reference signal that is obtained by the coupling unit 907. Then, the cancellation unit 911 for a near-field reflected self-interference signal directly subtracts the reconstructed near-field reflected self-interference signal from the second communication signal, so as to reduce the near-field reflected self-interference signal in the second communication signal.

Figure 10:
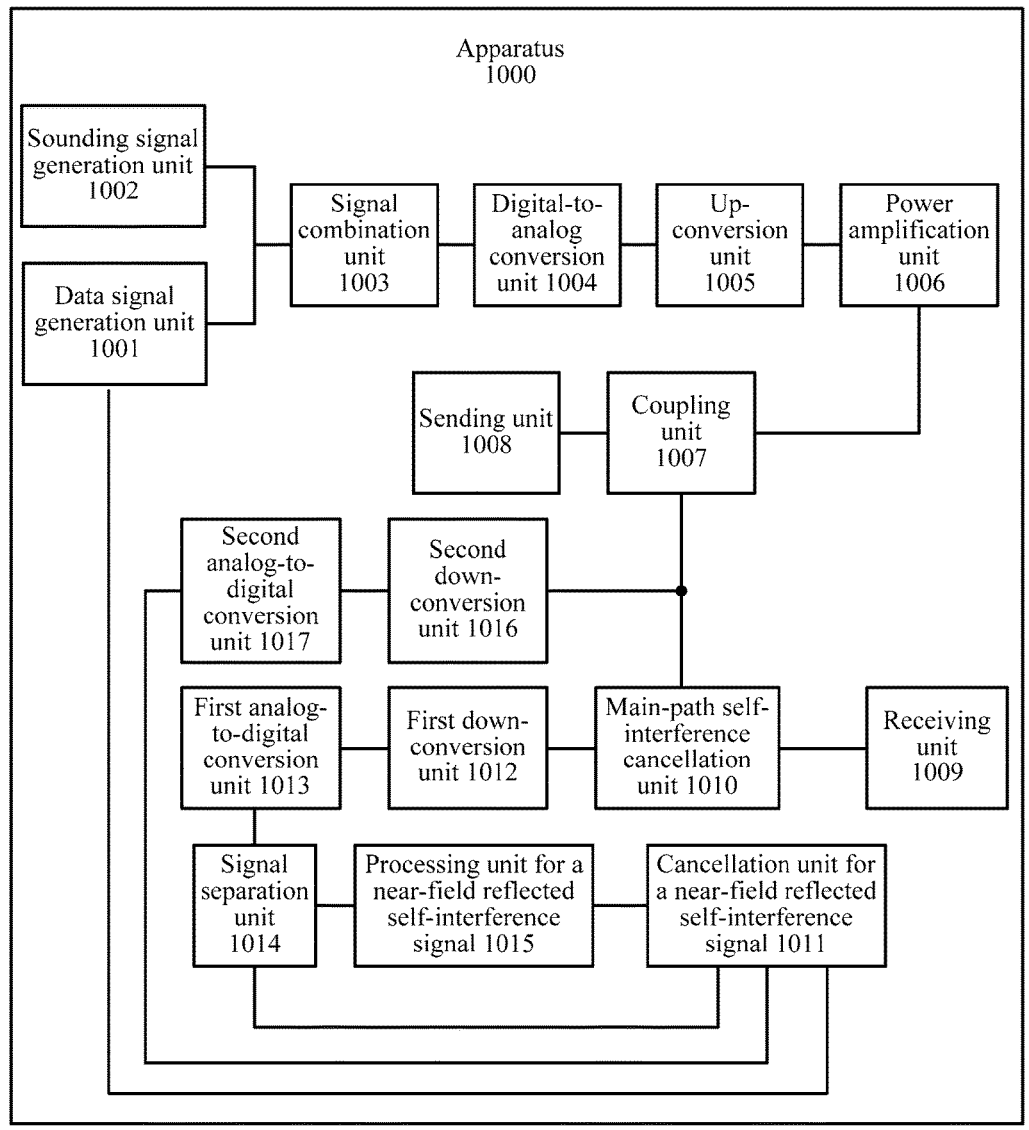
FIG. 10 is a structural block diagram of an apparatus according to an embodiment of the present invention.

FIG. 10 is a structural block diagram of an apparatus according to an embodiment of the present invention. The apparatus 1000 shown in FIG. 10 is a specific embodiment of the apparatus 600 shown in FIG. 6. The embodiment shown in FIG. 10 is an embodiment in which a bandwidth used for sending a sounding signal is greater than or equal to a bandwidth used for sending a first communication signal, and a super-resolution delay algorithm or a low-complexity super-resolution delay algorithm is used. The apparatus 1000 shown in FIG. 10 may be applied when an analog-to-digital conversion unit of a receiver has a relatively large dynamic range (for example, greater than 14 bits), or has a relatively low transmit power (for example, less than 20 dBm). As shown in FIG. 10, the apparatus 1000 includes: a data signal generating unit 1001, a sounding signal generating unit 1002, a signal combination unit 1003, a digital-to-analog conversion unit 1004, an up-conversion unit 1005, a power amplification unit 1006, a coupling unit 1007, a sending unit 1008, a receiving unit 1009, a main-path self-interference cancellation unit 1010, a cancellation unit 1011 for a near-field reflected self-interference signal, a first down-conversion unit 1012, a first analog-to-digital conversion unit 1013, a signal separation unit 1014, and a processing unit 1015 for a near-field reflected self-interference signal.

The data signal generating unit 1001 is configured to generate a first communication signal. The sounding signal generating unit 1002 is configured to generate a sounding signal. A bandwidth of the sounding signal is greater than or equal to a bandwidth of the first communication signal. The signal combination unit 1003 combines the sounding signal and the first communication signal into one radio frequency signal in a time division multiplexing manner. A specific combination method and a timeslot structure of the radio frequency signal have been described in the foregoing, and no further details are provided herein again. The coupling unit 1007 samples a radio frequency signal passing through an intermediate radio frequency channel, to obtain a self-interference radio frequency reference signal, where the intermediate radio frequency channel includes the digital-to-analog conversion unit 1004, the up-conversion unit 1005, and the power amplification unit 1006. Then, the sending unit 1008 is configured to send the radio frequency signal. Further, if one antenna is shared for transmission and reception, the apparatus 1000 further needs to include a circulator unit (not shown in the figure). After passing through the coupling unit 1007 and the circulator unit, the radio frequency signal is sent by the sending unit 1008, where the circulator unit is configured to isolate reception and transmission in a case one antenna in which is shared for reception and transmission. If different antennas are separately used for transmission and reception, the radio frequency signal does not need to pass through the circulator unit.

An input signal (including a second data signal and an echo signal that corresponds to the radio frequency signal) received by the receiving unit 1009 needs to pass through the main-path self-interference cancellation unit 1010. The main-path self-interference cancellation unit 1010 does not distinguish a sounding timeslot and a data transmission timeslot of a near-field reflection channel, and performs main-path self-interference signal cancellation processing on all signals according to the self-interference radio frequency reference signal obtained by the coupling unit 1007. A low noise amplification unit (not shown in the figure) amplifies the input signal in which a main-path self-interference signal is canceled.

When the analog-to-digital conversion unit of the receiver has a relatively large dynamic range (for example, greater than 14 bits), or has a relatively low transmit power (for example, less than 20 dBm), the near-field reflected self-interference signal may also be canceled at the baseband. In this case, the input signal passing through the low noise amplification unit is first converted by the first down-conversion unit 1012 and the first analog-to-digital conversion unit 1013, and then is input to a baseband, and the signal separation unit 1014 separates a sounding timeslot and a transmit timeslot of a second communication signal. The processing unit 1015 for a near-field reflected self-interference signal generates a near-field reflection channel parameter by using a super-resolution delay algorithm or a low-complexity super-resolution delay algorithm. Further, the processing unit 1015 for a near-field reflected self-interference signal may further accumulate multiple near-field reflection channel parameters, and obtain an average value of the multiple near-field reflection channel parameters. The cancellation unit 1011 for a near-field reflected self-interference signal reduces the near-field reflected self-interference signal according to the near-field reflection channel parameter or the average value of the multiple near-field reflection channel parameters. The cancellation unit 1011 for a near-field reflected self-interference signal may use a structure based on a digital filter unit.

Optionally, in an embodiment, the cancellation unit 1011 for a near-field reflected self-interference signal may determine a reconstructed near-field reflected self-interference signal according to the first communication signal generated by the data signal generating unit 1001 and a near-field reflection channel parameter (or the average value of the multiple near-field reflection channel parameters) provided by the processing unit 1015 for a near-field reflected self-interference signal. Then, the cancellation unit 1011 for a near-field reflected self-interference signal directly subtracts the reconstructed near-field reflected self-interference signal from the second communication signal, so as to reduce the near-field reflected self-interference signal in the second communication signal that is input to the baseband after conversion.

Optionally, in another embodiment, the cancellation unit 1011 for a near-field reflected self-interference signal may also determine the reconstructed near-field reflected self-interference signal according to the self-interference radio frequency reference signal and near-field reflection that are obtained by the coupling unit 1007 and the near-field reflection channel parameter (or the average value of the multiple near-field reflection channel parameters). In this case, the apparatus 1000 may further include a second down-conversion unit 1016 and a second analog-to-digital conversion unit 1017. In this way, the self-interference radio frequency reference signal is converted by the second down-conversion unit 1016 and the second analog-to-digital conversion unit 1017. The cancellation unit 1011 for a near-field reflected self-interference signal determines the reconstructed near-field reflected self-interference signal by using the near-field reflection channel parameter (or the average value of the multiple near-field reflection channel parameters) and the converted self-interference radio frequency reference signal. Then, the cancellation unit 1011 for a near-field reflected self-interference signal directly subtracts the reconstructed near-field reflected self-interference signal from the second communication signal, so as to reduce the near-field reflected self-interference signal in the second communication signal.

Figure 11:
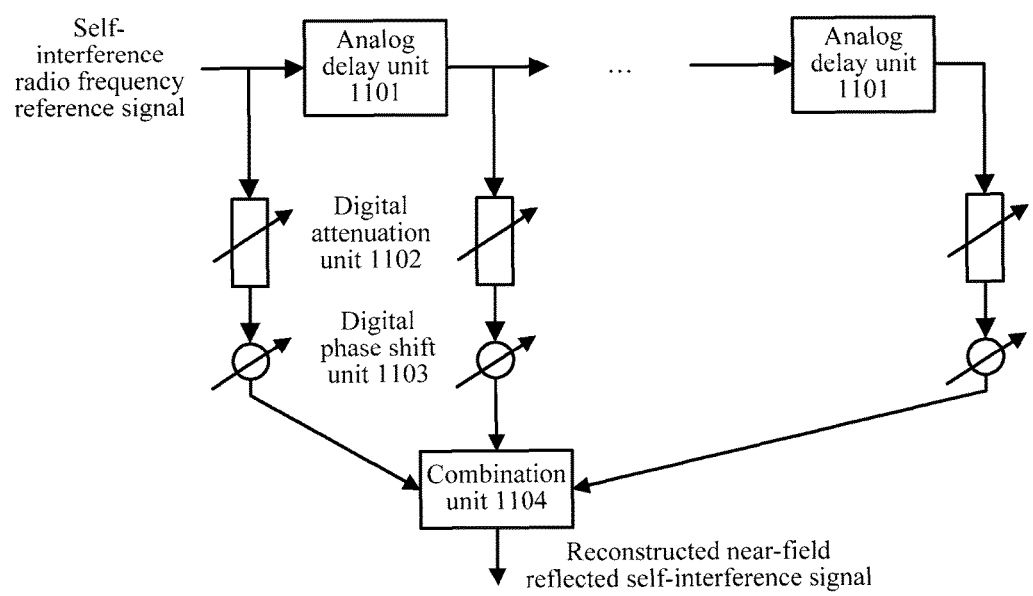
FIG. 11 is a schematic structural diagram of a cancellation unit for a near-field reflected self-interference signal according to an embodiment of the present invention.

FIG. 11 is a schematic structural diagram of a cancellation unit for a near-field reflected self-interference signal according to an embodiment of the present invention. The cancellation unit for a near-field reflected self-interference signal shown in FIG. 11 may be applied in the apparatus shown in FIG. 7 or FIG. 9.

The self-interference radio frequency reference signal passes through multiple levels of analog delay units 1101. Corresponding to different delay components of a near-field reflection signal, in each branch, a digital attenuation unit 1102 and a digital phase shift unit 1103 further adjust amplitude and a phase of each branch, and finally, a combination unit 1104 combines the signals to form a reconstructed near-field reflected self-interference signal. A delay of the analog delay unit 1101, and the amplitude and the phases of the digital attenuation unit 1102 and the digital phase shift unit 1103 are provided by a processing unit for a near-field reflected self-interference signal, that is, are set according to a near-field reflection channel parameter (or an average value of multiple near-field reflection channel parameters) provided by the processing unit for a near-field reflected self-interference signal. The reconstructed near-field reflected self-interference signal is subtracted from a received signal (that is, a second communication signal), to obtain a second communication signal in which the near-field reflected self-interference signal is subtracted.

Figure 12:
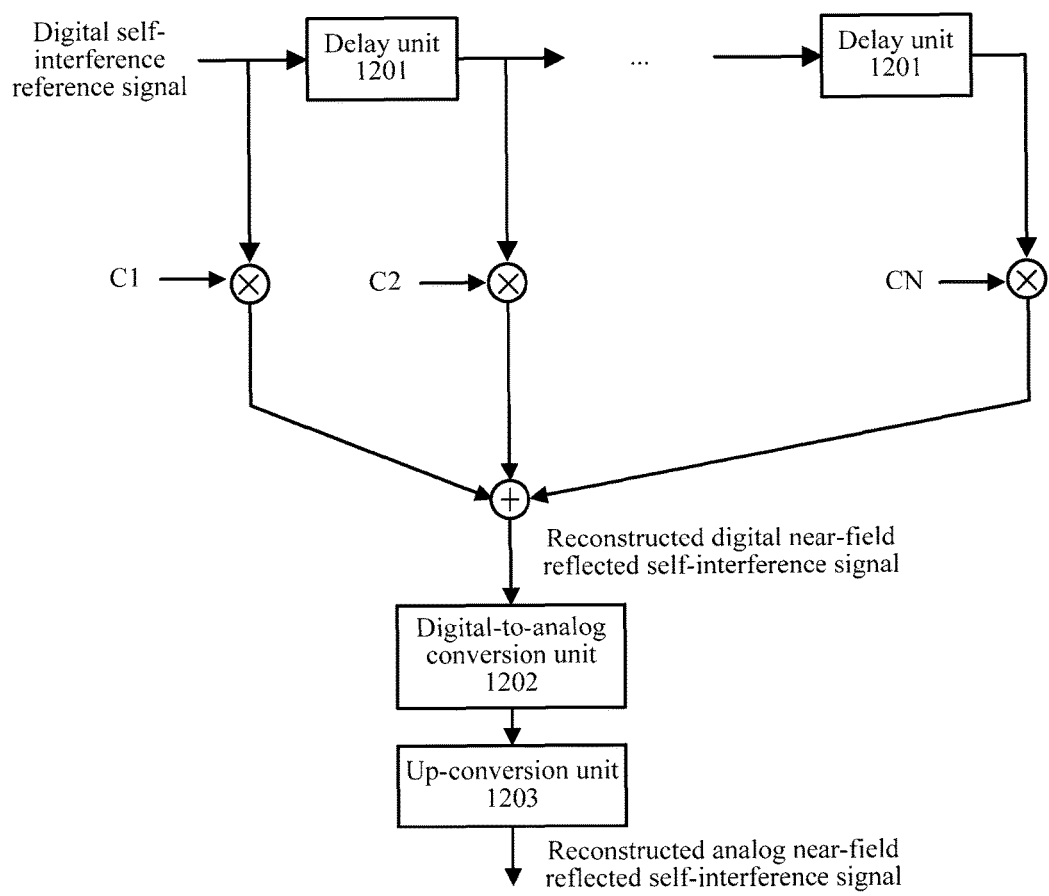
FIG. 12 is a schematic structural diagram of another cancellation unit for a near-field reflected self-interference signal according to an embodiment of the present invention.

FIG. 12 is a schematic structural diagram of another cancellation unit for a near-field reflected self-interference signal according to an embodiment of the present invention.

Filter coefficients C1, C2, . . . , and CN of a digital finite impulse response (Finite Impulse Response, FIR) filter and a delay of a delay unit 1201 are set according to a near-field reflection channel parameter (or an average value of multiple near-field reflection channel parameters) provided by the processing unit for a near-field reflected self-interference signal. A digital self-interference reference signal passes through multiple levels of delay units 1201. Corresponding to different delay components of a near-field reflection signal, filter coefficients of branches are different, multiple channels of signals are combined into a reconstructed digital near-field reflected self-interference signal, and then, the reconstructed digital near-field reflected self-interference signal passes through units such as a digital-to-analog conversion unit 1202 and an up-conversion unit 1203, to obtain a reconstructed analog near-field reflected self-interference signal. The digital self-interference reference signal is the same as a digital self-interference reference signal used by a cancellation unit for a far-field reflected self-interference signal, and directly may be a baseband signal of a first communication signal generated by a data signal generating unit in a transmit branch, or may be a baseband signal that is obtained after a self-interference radio frequency reference signal obtained through sampling by a coupling unit after power amplification is converted by a down-conversion unit and an analog-to-digital conversion unit. Especially, when the cancellation unit for a near-field reflected self-interference signal shown in FIG. 12 is used in the apparatuses shown in FIG. 8 and FIG. 10, the reconstructed near-field reflected self-interference signals in FIG. 8 and FIG. 10 are the reconstructed digital near-field reflected self-interference signals. In other words, if the cancellation unit for a near-field reflected self-interference signal shown in FIG. 12 is used in the apparatuses in FIG. 8 and FIG. 10, the cancellation unit for a near-field reflected self-interference signal may not include the digital-to-analog conversion unit 1202 or the up-conversion unit 1203. The reconstructed digital near-field reflected self-interference signal may be directly used as the reconstructed near-field reflected self-interference signal, and is subtracted from the second communication signal.

Figure 13:
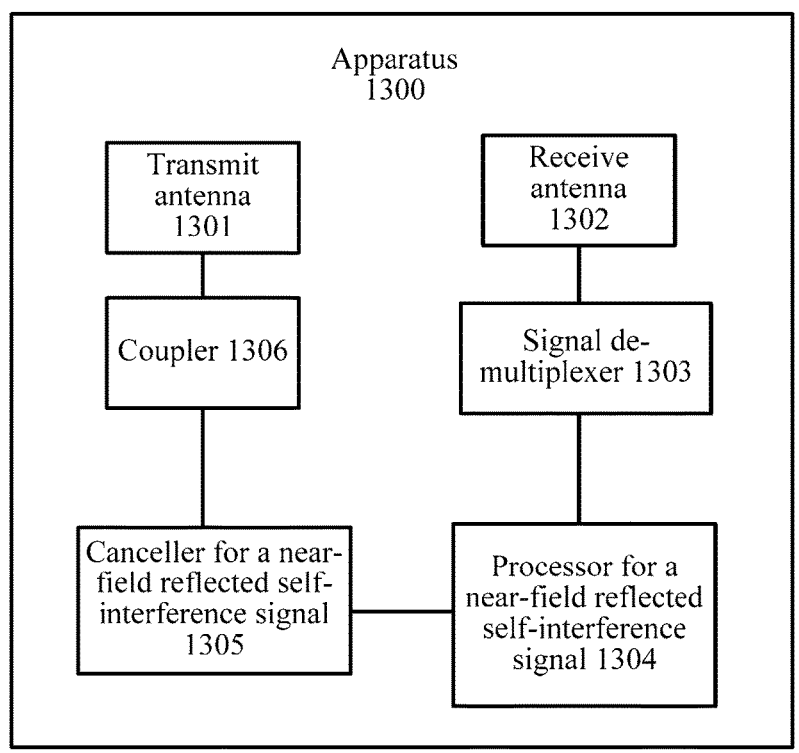
FIG. 13 is a structural block diagram of an apparatus according to an embodiment of the present invention.

FIG. 13 is a structural block diagram of an apparatus according to an embodiment of the present invention. The apparatus shown in FIG. 13 supports a wireless full duplex system. The apparatus may be located in a communications node such as user equipment or a base station. The apparatus 1300 shown in FIG. 13 includes a transmit antenna 1301, a receive antenna 1302, a signal de-multiplexer 1303, a processor 1304 for a near-field reflected self-interference signal, and a canceller 1305 for a near-field reflected self-interference signal.

The transmit antenna 1301 is configured to send a sounding signal and a first communication signal, where a timeslot used for sending the sounding signal by the transmit antenna 1301 is different from a timeslot used for sending the first communication signal, and the sounding signal is a large time-bandwidth product signal.

The receive antenna 1302 is configured to receive an input signal, where the input signal includes a second communication signal sent by another apparatus and an echo signal that corresponds to the sounding signal and the first communication signal that are sent by the transmit antenna 1301.

The signal de-multiplexer 1303 is configured to separate a near-field reflection signal corresponding to the sounding signal from the echo signal.

The processor 1304 for a near-field reflected self-interference signal is configured to determine, based on the near-field reflection signal, a near-field reflection channel parameter.

The canceller 1305 for a near-field reflected self-interference signal is configured to determine, based on the near-field reflection channel parameter, a reconstructed near-field reflected self-interference signal, and subtract the reconstructed near-field reflected self-interference signal from the second communication signal.

The apparatus 1300 shown in FIG. 13 sends a sounding signal in a time division multiplexing manner when sending a data signal, and can effectively recognize and reconstruct a near-field reflection signal, thereby achieving an objective of effectively reducing self-interference from a near-field reflection signal.

Optionally, in an embodiment, the transmit antenna 1301 may be specifically configured to send the sounding signal by using a bandwidth greater than a bandwidth used for sending the first communication signal. In this case, the processor 1304 for a near-field reflected self-interference signal is specifically configured to perform matched filtering on the near-field reflection signal, to obtain a filtered near-field reflection signal, and determine the near-field reflection channel parameter according to the filtered near-field reflection signal.

Optionally, in another embodiment, the transmit antenna 1301 may be specifically configured to send the sounding signal by using a bandwidth greater than or equal to a bandwidth used for sending the first communication signal. In this case, the processor 1304 for a near-field reflected self-interference signal may be specifically configured to determine, by using a super-resolution delay algorithm, the near-field reflection channel parameter corresponding to the near-field reflection signal, where the super-resolution delay algorithm may be a maximum likelihood estimation algorithm, a high-resolution direction-of-arrival estimation algorithm based on array signal processing, matching pursuit, orthogonal matching pursuit, or the like.

Further, the super-resolution delay algorithm may further include a low-complexity super-resolution delay algorithm. For a specific process, refer to description of the method, and no further details are provided herein again.

Optionally, in an embodiment, the canceller 1305 for a near-field reflected self-interference signal is specifically configured to determine a timeslot corresponding to a second data signal, determine, in the timeslot corresponding to the second data signal and according to the near-field reflection channel parameter and the first communication signal, the reconstructed near-field reflected self-interference signal, and subtract the reconstructed near-field reflected self-interference signal from the second communication signal.

Optionally, in another embodiment, the processor 1304 for a near-field reflected self-interference signal may be further configured to accumulate multiple near-field reflection channel parameters, and determine an average value of the multiple near-field reflection channel parameters. The canceller 1305 for a near-field reflected self-interference signal is specifically configured to determine a timeslot corresponding to a second data signal, determine, in the timeslot corresponding to the second data signal and according to the average value of the multiple near-field reflection channel parameters and the first communication signal, the reconstructed near-field reflected self-interference signal, and subtract the reconstructed near-field reflected self-interference signal from the second communication signal.

Optionally, in an embodiment, the apparatus 1300 may further include a coupler 1306, configured to sample a signal to be sent, to obtain a self-interference radio frequency reference signal, where the signal to be sent includes the sounding signal and the first communication signal. Specifically, the sounding signal and the first communication signal are combined into one radio frequency signal in a time division multiplexing manner. The sounding signal and the first communication signal that are sent by the transmit antenna 1301 are the radio frequency signal, that is, the combined sounding signal and first communication signal. A specific relationship among the sounding signal, the first communication signal, and the radio frequency signal has been described specifically in the foregoing context, and no further details are provided herein again.

When the apparatus 1300 includes the coupler 1306, in an embodiment, the canceller 1305 for a near-field reflected self-interference signal is specifically configured to determine a timeslot corresponding to a second data signal, determine, in the timeslot corresponding to the second data signal and according to the near-field reflection channel parameter and the self-interference radio frequency reference signal, the reconstructed near-field reflected self-interference signal, and subtract the reconstructed near-field reflected self-interference signal from the second communication signal.

When the apparatus 1300 includes the coupler 1306, in another embodiment, the processor 1304 for a near-field reflected self-interference signal may be further configured to accumulate multiple near-field reflection channel parameters, and determine an average value of the multiple near-field reflection channel parameters. The canceller 1305 for a near-field reflected self-interference signal is specifically configured to determine a timeslot corresponding to a second data signal, determine, in the timeslot corresponding to the second data signal and according to the average value of the multiple near-field reflection channel parameters and the self-interference radio frequency reference signal, the reconstructed near-field reflected self-interference signal, and subtract the reconstructed near-field reflected self-interference signal from the second communication signal.

Further, the cancellation unit 1305 for a near-field reflected self-interference signal starts working in the timeslot of the second data signal, and stops working in other timeslots.

Optionally, in an embodiment, when the apparatus 1300 supports multiple-input multiple-output, the transmit antenna 1301 is specifically configured to send the radio frequency signal separately by using multiple antennas. The receive antenna 1302 is specifically configured to receive the input signal separately by using the multiple antennas, where timeslots used for sending the sounding signal by the multiple antennas are staggered.

Optionally, in an embodiment, the transmit antenna 1301 is specifically configured to send the radio frequency signal by using a timeslot that is staggered with a timeslot used for sending a radio frequency signal by an adjacent apparatus supporting the wireless full duplex.

Figure 14:
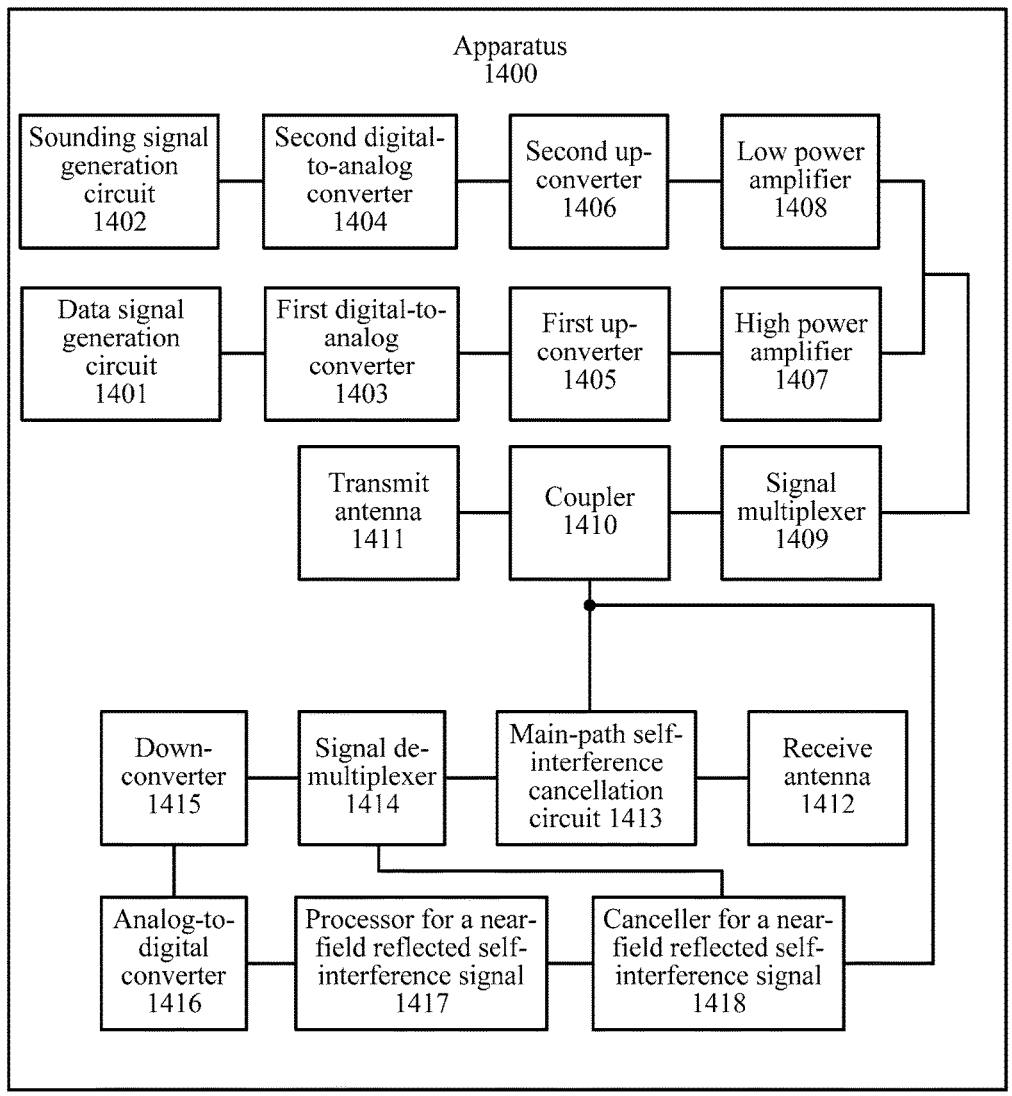
FIG. 14 is a structural block diagram of an apparatus according to an embodiment of the present invention.

FIG. 14 is a structural block diagram of an apparatus according to an embodiment of the present invention. The apparatus 1400 shown in FIG. 14 is a specific embodiment of the apparatus 1300 shown in FIG. 13. The embodiment shown in FIG. 14 is an embodiment in which a bandwidth used for sending a sounding signal is greater than a bandwidth used for sending a first communication signal, and a near-field reflection channel parameter is determined by using a matched filtering method. As shown in FIG. 14, the apparatus 1400 includes: a data signal generation circuit 1401, a sounding signal generation circuit 1402, a first digital-to-analog converter 1403, a second digital-to-analog converter 1404, a first up-converter 1405, a second up-converter 1406, a high power amplifier 1407, a low power amplifier 1408, a signal multiplexer 1409, a coupler 1410, a transmit antenna 1411, a receive antenna 1412, a main-path self-interference cancellation circuit 1413, a signal de-multiplexer 1414, a down-converter 1415, an analog-to-digital converter 1416, a processor 1417 for a near-field reflected self-interference signal, and a canceller 1418 for a near-field reflected self-interference signal.

The data signal generation circuit 1401 is configured to generate a first communication signal. The sounding signal generation circuit 1402 is configured to generate a sounding signal. Because the sounding signal and a data signal have different bandwidths, different intermediate radio frequency channels need to be used. An intermediate radio frequency channel corresponding to the first communication signal includes the first digital-to-analog converter 1403, the first up-converter 1405, and the high power amplifier 1407. An intermediate radio frequency channel corresponding to the sounding signal includes the second digital-to-analog converter 1404, the second up-converter 1406, and the low power amplifier 1408. Because a transmit power of the sounding signal is greatly less than a transmit power of the data signal, a power amplifier used in the intermediate radio frequency channel corresponding to the first communication signal is a high power amplifier having a relatively high output power, and a power amplifier used in the intermediate radio frequency channel corresponding to the sounding signal is a low power amplifier having a relatively low power. After the first communication signal and the sounding signal separately pass through corresponding intermediate radio frequency channels, the signal multiplexer 1409 combines the first communication signal and the sounding signal into one radio frequency signal in a time division multiplexing manner. A specific combination method and a timeslot structure of the radio frequency signal have been described in the foregoing, and no further details are provided herein again. The radio frequency signal passes through the coupler 1410, and the coupler 1410 is configured to sample a radio frequency signal to be sent, to obtain a self-interference radio frequency reference signal. Then, the transmit antenna 1411 is configured to send the radio frequency signal. Further, if one antenna is shared for transmission and reception, the apparatus 1400 further needs to include a circulator (not shown in the figure). After passing through the coupler 1410 and the circulator, the radio frequency signal is sent by the transmit antenna 1411, where the circulator is configured to isolate reception and transmission in a case one antenna in which is shared for reception and transmission. If different antennas are separately used for transmission and reception, the radio frequency signal does not need to pass through the circulator.

An input signal (including a second data signal and an echo signal that corresponds to the radio frequency signal) received by the receive antenna 1412 needs to pass through the main-path self-interference cancellation circuit 1413. The main-path self-interference cancellation circuit 1413 does not distinguish a sounding timeslot and a data transmission timeslot of a near-field reflection channel, and performs main-path self-interference signal cancellation processing on all signals according to the self-interference radio frequency reference signal obtained by the coupler 1410. After a low noise amplifier (not shown in the figure) amplifies an input signal that is obtained after the main-path self-interference signal is canceled, the signal de-multiplexer 1414 separates the sounding timeslot and a transmit timeslot of the second communication signal, where the second communication signal is received from another apparatus. A near-field reflection signal that is received in the sounding timeslot of the near-field reflection channel and corresponds to the sounding signal is converted by the down-converter 1415 and the analog-to-digital converter 1416 into a baseband signal, and is processed by the processor 1417 for a near-field reflected self-interference signal to generate a near-field reflection channel parameter. Specifically, the processor 1417 for a near-field reflected self-interference signal generates the near-field reflection channel parameter by using a matched filtering method. Further, the processor 1417 for a near-field reflected self-interference signal may further accumulate multiple near-field reflection channel parameters, and obtain an average value of the multiple near-field reflection channel parameters. The second communication signal received in the transmit timeslot of the second communication signal first passes through the canceller 1418 for a near-field reflected self-interference signal for cancellation of the near-field reflected self-interference signal, then is converted by the down-converter and the analog-to-digital converter into a baseband, and further passes through a canceller for a far-field reflected self-interference signal (not shown in the figure) for cancellation of a far-field reflected self-interference signal, to obtain a data signal in which a self-interference signal has been canceled. The canceller 1418 for a near-field reflected self-interference signal specifically determines a reconstructed near-field reflected self-interference signal by using the near-field reflection channel parameter (or an average value of multiple near-field reflection channel parameters) provided by the processor 1417 for a near-field reflected self-interference signal and the self-interference radio frequency reference signal provided by the coupler 1410, and subtracts the reconstructed near-field reflected self-interference signal from the second communication signal.

Figure 15:
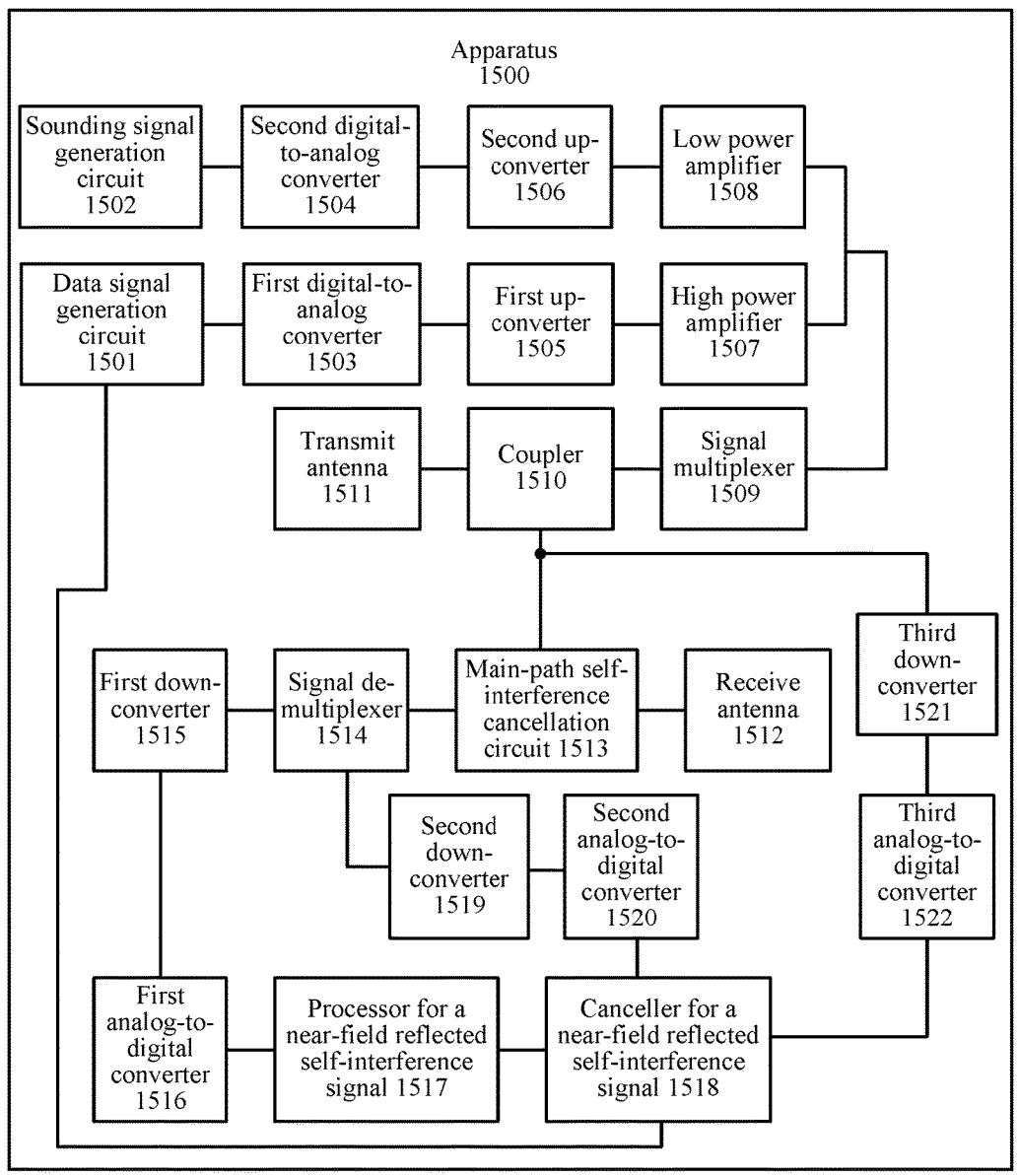
FIG. 15 is a structural block diagram of an apparatus according to an embodiment of the present invention.

FIG. 15 is a structural block diagram of an apparatus according to an embodiment of the present invention. The apparatus 1500 shown in FIG. 15 is a specific embodiment of the apparatus 1300 shown in FIG. 13. The embodiment shown in FIG. 15 is another embodiment in which a bandwidth used for sending a sounding signal is greater than a bandwidth used for sending a first communication signal, and a near-field reflection channel parameter is determined by using a matched filtering method. The apparatus 1500 shown in FIG. 15 may be applied when an analog-to-digital converter of a receiver has a relatively large dynamic range (for example, greater than 14 bits), or has a relatively low transmit power (for example, less than 20 dBm). As shown in FIG. 15, the apparatus 1500 includes: a data signal generation circuit 1501, a sounding signal generation circuit 1502, a first digital-to-analog converter 1503, a second digital-to-analog converter 1504, a first up-converter 1505, a second up-converter 1506, a high power amplifier 1507, a low power amplifier 1508, a signal multiplexer, 1509, a coupler 1510, a transmit antenna 1511, a receive antenna 1512, a main-path self-interference cancellation circuit 1513, a signal de-multiplexer 1514, a first down-converter 1515, a first analog-to-digital converter 1516, a processor 1517 for a near-field reflected self-interference signal, a canceller 1518 for a near-field reflected self-interference signal, a second down-converter 1519, and a second analog-to-digital converter 1520.

The data signal generation circuit 1501 is configured to generate a first communication signal. The sounding signal generation circuit 1502 is configured to generate a sounding signal. Because the sounding signal and a data signal have different bandwidths, different intermediate radio frequency channels need to be used. An intermediate radio frequency channel corresponding to the first communication signal includes the first digital-to-analog converter 1503, the first up-converter 1505, and the high power amplifier 1507. An intermediate radio frequency channel corresponding to the sounding signal includes the second digital-to-analog converter 1504, the second up-converter 1506, and the low power amplifier 1508. Because a transmit power of the sounding signal is greatly less than a transmit power of the data signal, a power amplifier used in the intermediate radio frequency channel corresponding to the first communication signal is a high power amplifier having a relatively high output power, and a power amplifier used in the intermediate radio frequency channel corresponding to the sounding signal is a low power amplifier having a relatively low power. After the first communication signal and the sounding signal separately pass through corresponding intermediate radio frequency channels, the signal multiplexer 1509 combines the first communication signal and the sounding signal into one radio frequency signal in a time division multiplexing manner. A specific combination method and a timeslot structure of the radio frequency signal have been described in the foregoing, and no further details are provided herein again. The radio frequency signal passes through the coupler 1510, and the coupler 1510 is configured to sample a signal to be sent, to obtain a self-interference radio frequency reference signal. Then, the transmit antenna 1511 is configured to send the radio frequency signal. Further, if one antenna is shared for transmission and reception, the apparatus 1500 further needs to include a circulator (not shown in the figure). After passing through the coupler 1510 and the circulator, the radio frequency signal is sent by the transmit antenna 1511, where the circulator is configured to isolate reception and transmission in a case one antenna in which is shared for reception and transmission. If different antennas are separately used for transmission and reception, the radio frequency signal does not need to pass through the circulator.

An input signal (including a second data signal and an echo signal that corresponds to the radio frequency signal) received by the receive antenna 1512 needs to pass through the main-path self-interference cancellation circuit 1513. The main-path self-interference cancellation circuit 1513 does not distinguish a sounding timeslot and a data transmission timeslot of a near-field reflection channel, and performs main-path self-interference signal cancellation processing on all signals according to the self-interference radio frequency reference signal obtained by the coupler 1510. After a low noise amplifier (not shown in the figure)

amplifies an input signal that is obtained after the main-path self-interference signal is canceled, the signal de-multiplexer 1514 separates the sounding timeslot and a transmit timeslot of the second communication signal, where the second communication signal is received from another apparatus. A near-field reflection signal that is received in the sounding timeslot of the near-field reflection channel and corresponds to the sounding signal is converted by the first down-converter 1515 and the first analog-to-digital converter 1516 into a baseband signal, and is processed by the processor 1517 for a near-field reflected self-interference signal to generate a near-field reflection channel parameter. Specifically, the processor 1517 for a near-field reflected self-interference signal generates the near-field reflection channel parameter by using a matched filtering method. Further, the processor 1517 for a near-field reflected self-interference signal may further accumulate multiple near-field reflection channel parameters, and obtain an average value of the multiple near-field reflection channel parameters.

When the analog-to-digital converter of the receiver has a relatively large dynamic range (for example, greater than 14 bits), or has a relatively low transmit power (for example, less than 20 dBm), the cancellation of the near-field reflected self-interference signal may also be implemented at the baseband. In this case, the second communication signal received in the transmit timeslot of the second communication signal first is converted by the second down-converter 1519 and the second analog-to-digital converter 1520, and then is input to the baseband, and then passes through the canceller 1518 for a near-field reflected self-interference signal for reduction of the near-field reflected self-interference signal. The canceller 1518 for a near-field reflected self-interference signal may use a structure based on a digital filter.

Optionally, in an embodiment, the canceller 1518 for a near-field reflected self-interference signal may determine the reconstructed near-field reflected self-interference signal according to the first communication signal generated by the data signal generation circuit 1501 and a near-field reflection channel parameter (or an average value of multiple near-field reflection channel parameters) provided by the processor 1517 for a near-field reflected self-interference signal. Then, the canceller 1518 for a near-field reflected self-interference signal directly subtracts the reconstructed near-field reflected self-interference signal from the second communication signal, so as to reduce the near-field reflected self-interference signal in the second communication signal that is input to the baseband after conversion.

Optionally, in another embodiment, the canceller 1518 for a near-field reflected self-interference signal may determine the reconstructed near-field reflected self-interference signal according to the self-interference radio frequency reference signal and near-field reflection that are obtained by the coupler 1510 and the near-field reflection channel parameter (or the average value of the multiple near-field reflection channel parameters). In this case, the apparatus 1500 may further include a third down-converter 1521 and a third analog-to-digital converter 1522. In this way, the self-interference radio frequency reference signal is converted by the third down-converter 1521 and the third analog-to-digital converter 1522. The canceller 1518 for a near-field reflected self-interference signal determines the reconstructed near-field reflected self-interference signal by using the near-field reflection channel parameter (or the average value of the multiple near-field reflection channel parameters) and the converted self-interference radio frequency reference signal. Then, the canceller 1518 for a near-field reflected self-interference signal directly subtracts the reconstructed near-field reflected self-interference signal from the second communication signal, so as to reduce the near-field reflected self-interference signal in the second communication signal.

Figure 16:
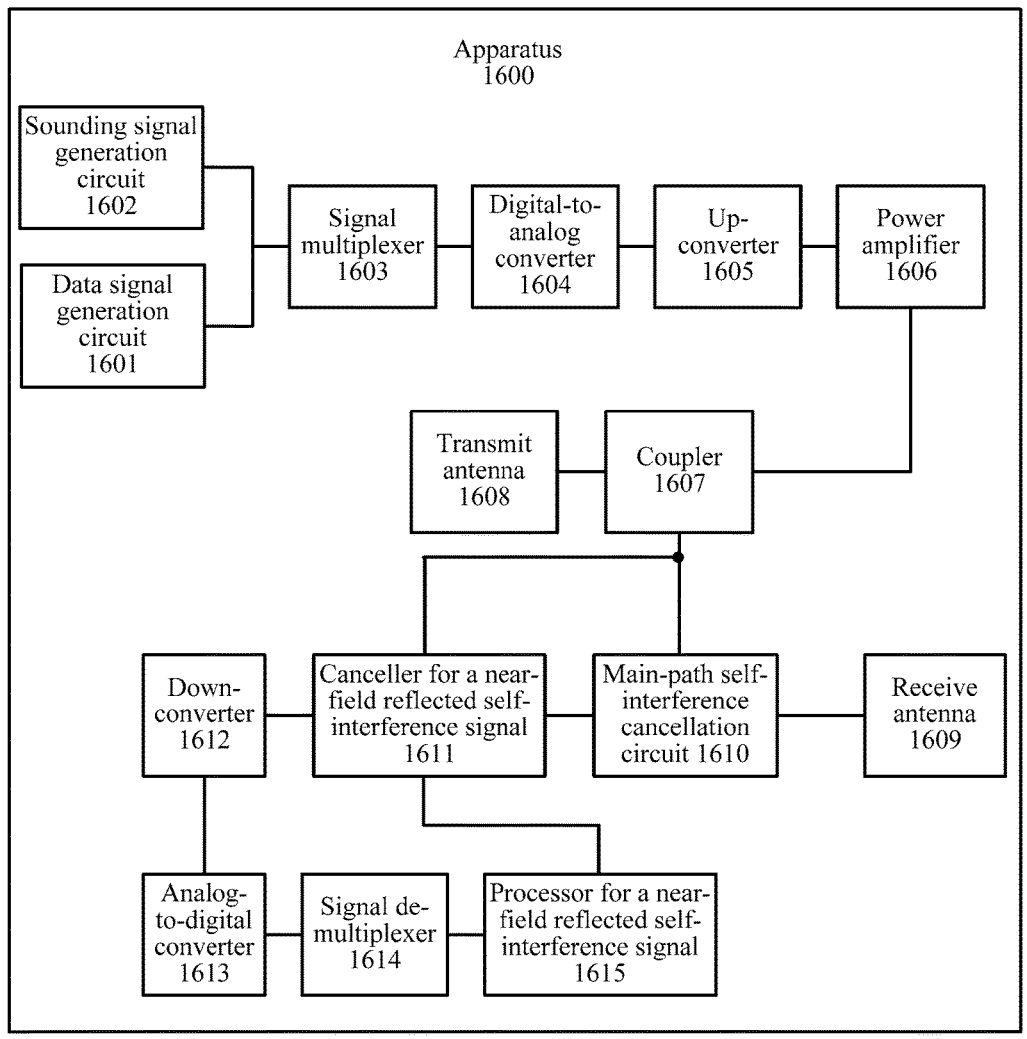
FIG. 16 is a structural block diagram of an apparatus according to an embodiment of the present invention.

FIG. 16 is a structural block diagram of an apparatus according to an embodiment of the present invention. The apparatus 1600 shown in FIG. 16 is a specific embodiment of the apparatus 1300 shown in FIG. 13. The embodiment shown in FIG. 16 is an embodiment in which a bandwidth used for sending a sounding signal is greater than or equal to a bandwidth used for sending a first communication signal, and a super-resolution delay algorithm or a low-complexity super-resolution delay algorithm is used. As shown in FIG. 16, the apparatus 1600 includes: a data signal generation circuit 1601, a sounding signal generation circuit 1602, a signal multiplexer 1603, a digital-to-analog converter 1604, an up-converter 1605, a power amplifier 1606, a coupler 1607, a transmit antenna 1608, a receive antenna 1609, a main-path self-interference cancellation circuit 1610, a canceller 1611 for a near-field reflected self-interference signal, a down-converter 1612, an analog-to-digital converter 1613, a signal de-multiplexer 1614, and a processor 1615 for a near-field reflected self-interference signal.

The data signal generation circuit 1601 is configured to generate a first communication signal. The sounding signal generation circuit 1602 is configured to generate a sounding signal. A bandwidth of the sounding signal is greater than or equal to a bandwidth of the first communication signal. The signal multiplexer 1603 combines the sounding signal and the first communication signal into one radio frequency signal in a time division multiplexing manner. A specific combination method and a timeslot structure of the radio frequency signal have been described in the foregoing, and no further details are provided herein again. The coupler 1607 samples a radio frequency signal passing through the intermediate radio frequency channel, to obtain the self-interference radio frequency reference signal, where the intermediate radio frequency channel includes the digital-to-analog converter 1604, the up-converter 1605, and the power amplifier 1606. Then, the transmit antenna 1608 is configured to send the radio frequency signal. Further, if one antenna is shared for transmission and reception, the apparatus 1600 further needs to include a circulator (not shown in the figure). After passing through the coupler 1607 and the circulator, the radio frequency signal is sent by the transmit antenna 1608, where the circulator is configured to isolate reception and transmission in a case one antenna in which is shared for reception and transmission. If different antennas are separately used for transmission and reception, the radio frequency signal does not need to pass through the circulator.

An input signal (including a second data signal and an echo signal that corresponds to the radio frequency signal) received by the receive antenna 1609 needs to pass through the main-path self-interference cancellation circuit 1610. The main-path self-interference cancellation circuit 1610 does not distinguish a sounding timeslot and a data transmission timeslot of a near-field reflection channel, and performs main-path self-interference signal cancellation processing on all signals according to the self-interference radio frequency reference signal obtained by the coupler 1607. A low noise amplifier (not shown in the figure) amplifies the input signal in which a main-path self-interference signal is canceled. Then, the input signal passes through the canceller for a near-field reflected self-interference signal 1610, and then is converted by the down-converter 1612 and the analog-to-digital converter 1613 into a baseband. The canceller for a near-field reflected self-interference signal 1610 is configured to reduce a near-field reflected self-interference signal in the second communication signal, where the second communication signal is received from another apparatus. The canceller for a near-field reflected self-interference signal 1610 only works in the transmit timeslot of the second communication signal, and does not work in a sounding timeslot. After the input signal is converted into a baseband, the signal de-multiplexer 1614 separates the sounding timeslot and the transmit timeslot of the second communication signal. The processor 1615 for a near-field reflected self-interference signal generates a near-field reflection channel parameter by using a super-resolution delay algorithm or a low-complexity super-resolution delay algorithm. Further, the processor 1615 for a near-field reflected self-interference signal may further accumulate multiple near-field reflection channel parameters, and obtain an average value of the multiple near-field reflection channel parameters. The canceller 1611 for a near-field reflected self-interference signal determines the reconstructed near-field reflected self-interference signal by using the near-field reflection channel parameter or the average value of the multiple near-field reflection channel parameters, and the self-interference radio frequency reference signal that is obtained by the coupler 1607. Then, the canceller 1611 for a near-field reflected self-interference signal directly subtracts the reconstructed near-field reflected self-interference signal from the second communication signal, so as to reduce the near-field reflected self-interference signal in the second communication signal.

Figure 17:
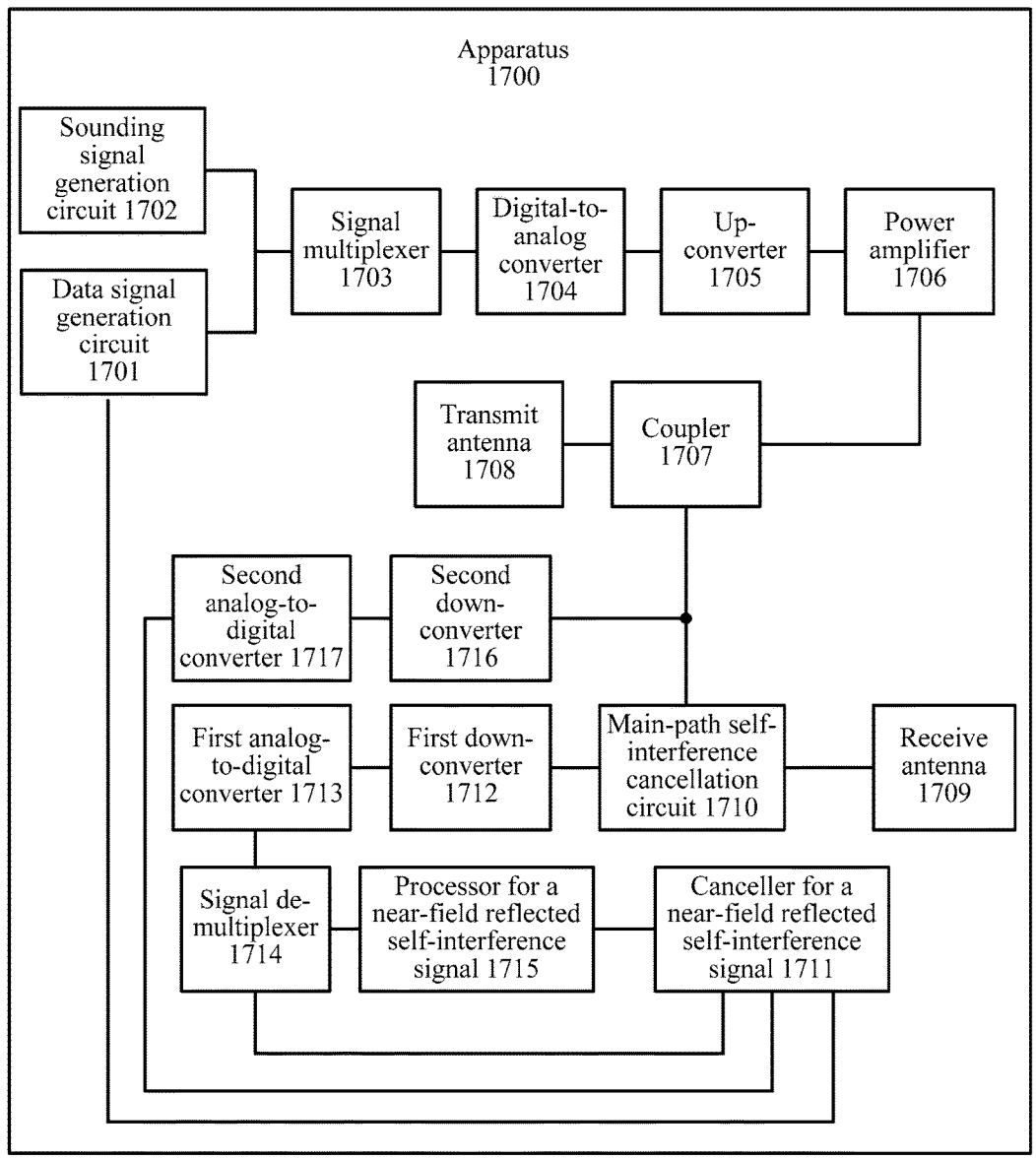
FIG. 17 is a structural block diagram of an apparatus according to an embodiment of the present invention.

FIG. 17 is a structural block diagram of an apparatus according to an embodiment of the present invention. The apparatus 1700 shown in FIG. 17 is a specific embodiment of the apparatus 1300 shown in FIG. 13. The embodiment shown in FIG. 17 is an embodiment in which a bandwidth used for sending a sounding signal is greater than or equal to a bandwidth used for sending a first communication signal, and a super-resolution delay algorithm or a low-complexity super-resolution delay algorithm is used. The apparatus 1700 shown in FIG. 17 may be applied when an analog-to-digital converter of a receiver has a relatively large dynamic range (for example, greater than 14 bits), or has a relatively low transmit power (for example, less than 20 dBm). As shown in FIG. 17, the apparatus 1700 includes: a data signal generation circuit 1701, a sounding signal generation circuit 1702, a signal multiplexer 1703, a digital-to-analog converter 1704, an up-converter 1705, a power amplifier 1706, a coupler 1707, a transmit antenna 1708, a receive antenna 1709, a main-path self-interference cancellation circuit 1710, a canceller 1711 for a near-field reflected self-interference signal, a first down-converter 1712, a first analog-to-digital converter 1713, a signal de-multiplexer 1714, and a processor 1715 for a near-field reflected self-interference signal.

The data signal generation circuit 1701 is configured to generate a first communication signal. The sounding signal generation circuit 1702 is configured to generate a sounding signal. A bandwidth of the sounding signal is greater than or equal to a bandwidth of the first communication signal. The signal multiplexer 1703 combines the sounding signal and the first communication signal into one radio frequency signal in a time division multiplexing manner. A specific combination method and a timeslot structure of the radio frequency signal have been described in the foregoing, and no further details are provided herein again. The coupler 1707 samples a radio frequency signal passing through an intermediate radio frequency channel, to obtain the self-interference radio frequency reference signal, where the intermediate radio frequency channel includes the digital-to-analog converter 1704, the up-converter 1705, and the power amplifier 1706. Then, the transmit antenna 1708 is configured to send the radio frequency signal. Further, if one antenna is shared for transmission and reception, the apparatus 1700 further needs to include a circulator (not shown in the figure). After passing through the coupler 1707 and the circulator, the radio frequency signal is sent by the transmit antenna 1708, where the circulator is configured to isolate reception and transmission in a case one antenna in which is shared for reception and transmission. If different antennas are separately used for transmission and reception, the radio frequency signal does not need to pass through the circulator.

An input signal (including a second data signal and an echo signal that corresponds to the radio frequency signal) received by the receive antenna 1709 needs to pass through the main-path self-interference cancellation circuit 1710. The main-path self-interference cancellation circuit 1710 does not distinguish a sounding timeslot and a data transmission timeslot of a near-field reflection channel, and performs main-path self-interference signal cancellation processing on all signals according to the self-interference radio frequency reference signal obtained by the coupler 1707. A low noise amplifier (not shown in the figure) amplifies the input signal in which a main-path self-interference signal is canceled.

When the analog-to-digital converter of the receiver has a relatively large dynamic range (for example, greater than 14 bits), or has a relatively low transmit power (for example, less than 20 dBm), the cancellation of the near-field reflected self-interference signal may also be implemented at the baseband. In this case, the input signal passing through the low noise amplifier is first converted by the first down-converter 1712 and the first analog-to-digital converter 1713, and then is input to a baseband, and the signal de-multiplexer 1714 separates a sounding timeslot and a transmit timeslot of a second communication signal. The processor 1715 for a near-field reflected self-interference signal generates a near-field reflection channel parameter by using a super-resolution delay algorithm or a low-complexity super-resolution delay algorithm. Further, the processor 1715 for a near-field reflected self-interference signal may further accumulate multiple near-field reflection channel parameters, and obtain an average value of the multiple near-field reflection channel parameters. The canceller 1711 for a near-field reflected self-interference signal reduces the near-field reflected self-interference signal according to the near-field reflection channel parameter or the average value of the multiple near-field reflection channel parameters. The canceller 1711 for a near-field reflected self-interference signal 1715 may use a structure based on a digital filter.

Optionally, in an embodiment, the canceller 1711 for a near-field reflected self-interference signal may determine the reconstructed near-field reflected self-interference signal according to the first communication signal generated by the data signal generation circuit 1701 and the near-field reflection channel parameter (or the average value of the multiple near-field reflection channel parameters) provided by the processor 1715 for a near-field reflected self-interference signal. Then, the canceller 1711 for a near-field reflected self-interference signal directly subtracts the reconstructed near-field reflected self-interference signal from the second communication signal, so as to reduce the near-field reflected self-interference signal in the second communication signal that is input to the baseband after conversion.

Optionally, in another embodiment, the canceller 1711 for a near-field reflected self-interference signal may determine the reconstructed near-field reflected self-interference signal according to the self-interference radio frequency reference signal and near-field reflection that are obtained by the coupler 1707 and the near-field reflection channel parameter (or the average value of the multiple near-field reflection channel parameters). In this case, the apparatus 1700 may further include a second down-converter 1716 and a second analog-to-digital converter 1717. In this way, the self-interference radio frequency reference signal is converted by the second down-converter 1716 and the second analog-to-digital converter 1717. The canceller 1711 for a near-field reflected self-interference signal determines the reconstructed near-field reflected self-interference signal by using the near-field reflection channel parameter (or the average value of the multiple near-field reflection channel parameters) and the converted self-interference radio frequency reference signal. Then, the canceller 1711 for a near-field reflected self-interference signal directly subtracts the reconstructed near-field reflected self-interference signal from the second communication signal, so as to reduce the near-field reflected self-interference signal in the second communication signal.

Figure 18:
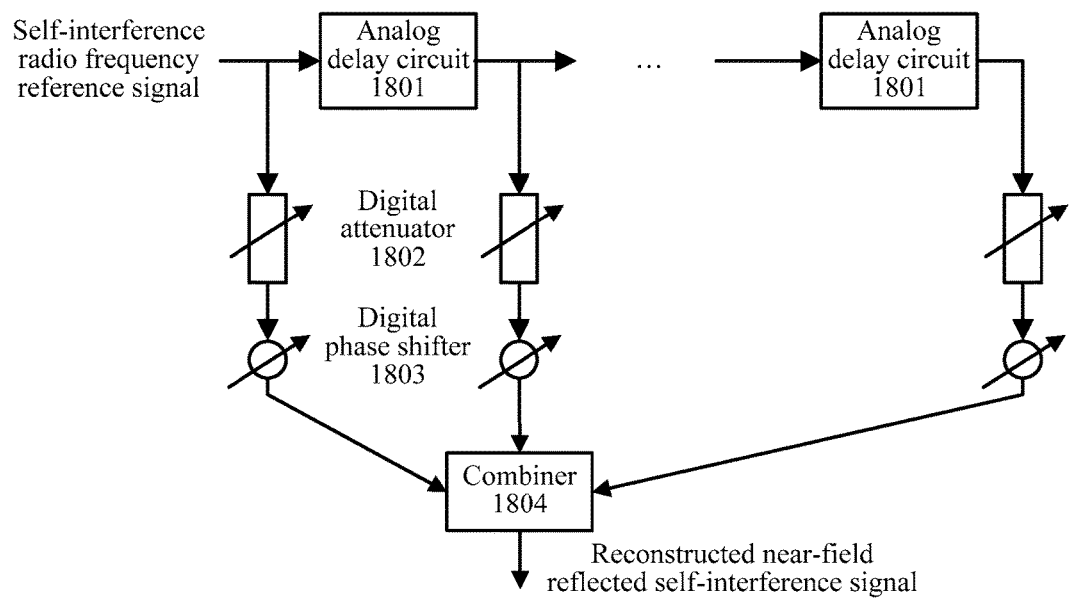
FIG. 18 is a schematic structural diagram of a canceller for a near-field reflected self-interference signal according to an embodiment of the present invention.

FIG. 18 is a schematic structural diagram of a canceller for a near-field reflected self-interference signal according to an embodiment of the present invention. The canceller for a near-field reflected self-interference signal shown in FIG. 18 may be applied in the apparatus shown in FIG. 14 or FIG. 16.

The self-interference radio frequency reference signal passes through multiple levels of analog delay circuits 1801. Corresponding to different delay components of a near-field reflection signal, in each branch, a digital attenuator 1802 and a digital phase shifter 1803 further adjust amplitude and a phase of each branch, and finally, a combiner 1804 combines the signals to form a reconstructed near-field reflected self-interference signal. A delay of an analog delay circuit 1801, and the amplitude and the phase of the digital attenuator 1802 and the digital phase shifter 1803 are provided by a processor for a near-field reflected self-interference signal, that is, are set according to a near-field reflection channel parameter (or an average value of multiple near-field reflection channel parameters) provided by the processor for a near-field reflected self-interference signal. The reconstructed near-field reflected self-interference signal is subtracted from a received signal (that is, a second communication signal), to obtain a second communication signal in which the near-field reflected self-interference signal is subtracted.

Figure 19:
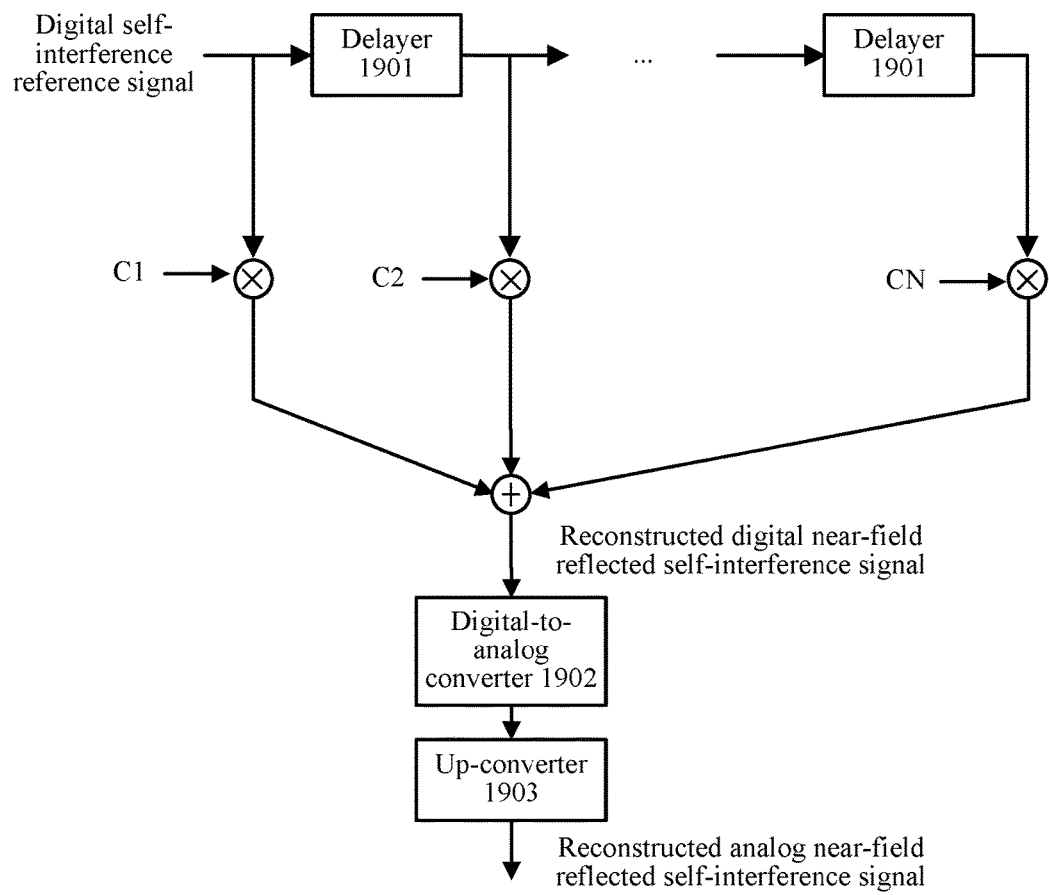
FIG. 19 is a schematic structural diagram of another canceller for a near-field reflected self-interference signal according to an embodiment of the present invention.

FIG. 19 is a schematic structural diagram of another canceller for a near-field reflected self-interference signal according to an embodiment of the present invention.

Filter coefficients C1, C2, . . . , and CN of a digital finite impulse response (Finite Impulse Response, FIR) filter and a delay of a delayer 1901 are set according to a near-field reflection channel parameter (or an average value of multiple near-field reflection channel parameters) provided by a processor for a near-field reflected self-interference signal. A digital self-interference reference signal passes through multiple levels of delayers 1901. Corresponding to different delay components of a near-field reflection signal, filter coefficients of branches are different, multiple channels of signals are combined into a reconstructed digital near-field reflected self-interference signal, and then, the reconstructed digital near-field reflected self-interference signal passes through units such as a digital-to-analog converter 1902 and an up-converter 1903, to obtain a reconstructed analog near-field reflected self-interference signal. The digital self-interference reference signal is the same as a digital self-interference reference signal used by a cancellation unit for a far-field reflected self-interference signal, and directly may be a baseband signal of a first communication signal generated by a data signal generation circuit in a transmit branch, or may be a baseband signal that is obtained after a self-interference radio frequency reference signal obtained through sampling by a coupling unit after power amplification is converted by a down-converter and an analog-to-digital converter. Especially, when the canceller for a near-field reflected self-interference signal shown in FIG. 19 is used in the apparatuses shown in FIG. 15 and FIG. 17, the reconstructed near-field reflected self-interference signals in FIG. 15 and FIG. 17 are the reconstructed digital near-field reflected self-interference signals. In other words, if the canceller for a near-field reflected self-interference signal shown in FIG. 19 is used in the apparatus in FIG. 15 or FIG. 17, the canceller for a near-field reflected self-interference signal may not include the digital-to-analog converter 1902 or the up-converter 1903. The reconstructed digital near-field reflected self-interference signal may be directly used as the reconstructed near-field reflected self-interference signal, and is subtracted from the second communication signal.

It should be noted that, FIG. 7 to FIG. 12 and FIG. 14 to FIG. 19 are merely specific embodiments used for helping better understanding of the present invention, rather than limiting the present invention.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the present invention.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in the present application, it should be understood that the disclosed system, apparatus, and method may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of the present invention may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of the present invention essentially, or the part contributing to the prior art, or a part of the technical solutions may be implemented in a form of a software product. The software product is stored in a storage medium and includes several instructions for instructing a computer device (which may be a personal computer, a server, or a network device) or a processor to perform all or a part of the steps of the methods described in the embodiments of the present invention. The foregoing storage medium includes: any medium that can store program code, such as a USB flash drive, a removable hard disk, a read-only memory (ROM, Read-Only Memory), a random access memory (RAM, Random Access Memory), a magnetic disk, or an optical disc.

The foregoing descriptions are merely specific embodiments of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A wireless full duplex communications apparatus, wherein the apparatus comprises:
   a transmitter, configured to send a sounding signal and a first communication signal through at least one antenna wherein a timeslot used for sending the sounding signal is different from a timeslot used for sending the first communication signal, and the sounding signal is a large time-bandwidth product signal;
   a receiver, configured to receive an input signal through at least one antenna, wherein the input signal comprises a second communication signal sent by another apparatus and an echo signal that corresponds to the sounding signal and the first communication signal; and
   a processor, configured to separate a near-field reflection signal corresponding to the sounding signal from the echo signal, wherein
   the processor is further configured to determine, based on the near-field reflection signal, a near-field reflection channel parameter; and
   the processor is further configured to determine, based on the near-field reflection channel parameter, a reconstructed near-field reflected self-interference signal, and subtract the reconstructed near-field reflected self-interference signal from the second communication signal.

2. The apparatus according to claim 1, wherein the processor is specifically configured to determine the reconstructed near-field reflected self-interference signal according to the near-field reflection channel parameter and the first communication signal, and subtract the reconstructed near-field reflected self-interference signal from the second communication signal.

3. The apparatus according to claim 1, wherein the apparatus further comprises:
   a coupler, configured to sample a signal to be sent, to obtain a self-interference radio frequency reference signal, wherein
   the processor is specifically configured to determine the reconstructed near-field reflected self-interference signal according to the near-field reflection channel parameter and the self-interference radio frequency reference signal, and subtract the reconstructed near-field reflected self-interference signal from the second communication signal.

4. The apparatus according to claim 1, wherein the transmitter is specifically configured to send the sounding signal by using a bandwidth greater than a bandwidth used for sending the first communication signal; and
   the processor is specifically configured to perform matched filtering on the near-field reflection signal, to obtain a filtered near-field reflection signal, and determine the near-field reflection channel parameter according to the filtered near-field reflection signal.

5. The apparatus according to claim 1, wherein the transmitter is specifically configured to send the sounding signal by using a bandwidth greater than or equal to a bandwidth used for sending the first communication signal; and
   the processor is specifically configured to determine, by using a super-resolution delay algorithm, the near-field reflection channel parameter corresponding to the near-field reflection signal.

6. The apparatus according to claim 5, wherein
the processor is specifically configured to determine the near-field reflection channel parameter by using the following formulas:

$$\hat{h}^{(k)} = (B + \text{diag}\{w^{(k)}\})^{-1} b, \text{ and}$$

$$w^{(k)} = \left[1 + \kappa - \frac{|\hat{h}^{(k-1)}|}{\max|\hat{h}^{(k-1)}|}\right] \circ w^{(k-1)},$$

wherein $\hat{h}$ represents the near-field reflection channel parameter, the superscript k of $\hat{h}^{(k)}$ identifies a result of the $k^{th}$ iteration, $B = A^H A$, A represents a sounding signal matrix, $b = A^H r$, r represents the near-field reflection signal, $w^{(k)}$ represents a weighting vector of the $k^{th}$ iteration, an initial value of the weighting vector is $w^{(0)} = \alpha 1_{M \times 1}$, $1_{M \times 1}$ represents an M×1-dimension column vector whose elements are all 1, M represents a multi-path delay distribution range of a near-field reflection channel, an operator "∘" represents that elements corresponding to two vectors are multiplied, and $\kappa$, k, and $\alpha$ are preset positive integers used for adjusting a convergence property.

7. The apparatus according to claim 6, wherein when B is a conjugate matrix,
   the processor is specifically configured to perform calculation through iteration from m=1 to m=M by using the following formula, to obtain $(B + \text{diag } \{w^{(k)}\})^{-1}$:

$$B_m^{-1} = D_{m-1} - \frac{w_m^{(k)}}{1 + w_m^{(k)} d_{m-1,mn}} d_{m-1,m} d_{m-1,m}^H, m = 1, 2, \ldots, M$$

wherein $B_m = B_{m-1} + w_m^{(k)} e_m e_m^H$, $D_{m-1} = B_{m-1}^{-1} = [d_{m-1,1}, d_{m-1,2}, \ldots, d_{m-1,M}]$, and especially, $B_0 = B$, $B_M^{-1} = (B + \text{diag}\{w^{(k)}\})^{-1}$, is the $m^{th}$ column vector of a matrix $D_{m-1}$, $d_{m-1,mm}$ is an element in the $m^{th}$ row and $m^{th}$ column of the matrix $D_{m-1}$, and $e_i$ represents an M×1-dimension column vector in which the $i^{th}$-column elements are 1 and the other elements are all 0.

8. A method for canceling a self-interference signal in a communications system, wherein the method is executed by an apparatus supporting wireless full duplex, and the method comprises:

sending a sounding signal and a first communication signal, wherein a timeslot used for sending the sounding signal is different from a timeslot used for sending the first communication signal, and the sounding signal is a large time-bandwidth product signal;

receiving an input signal, wherein the input signal comprises a second communication signal sent by another apparatus and an echo signal that corresponds to the sounding signal and the first communication signal;

separating a near-field reflection signal corresponding to the sounding signal from the echo signal;

determining, based on the near-field reflection signal, a near-field reflection channel parameter;

determining, based on the near-field reflection channel parameter, a reconstructed near-field reflected self-interference signal; and subtracting the reconstructed near-field reflected self-interference signal from the second communication signal, wherein the second communication signal is sent by another apparatus.

9. The method according to claim 8, wherein the determining, based on the near-field reflection channel parameter, a reconstructed near-field reflected self-interference signal comprises:

determining the reconstructed near-field reflected self-interference signal according to the near-field reflection channel parameter and the first communication signal.

10. The method according to claim 8, wherein the method further comprises:

sampling a signal to be sent, to obtain a self-interference radio frequency reference signal, wherein the determining, based on the near-field reflection channel parameter, a reconstructed near-field reflected self-interference signal comprises:

determining the reconstructed near-field reflected self-interference signal according to the near-field reflection channel parameter and the self-interference radio frequency reference signal.

11. The method according to claim 8, wherein the sending a sounding signal comprises:

sending the sounding signal in a transmit timeslot in a sounding timeslot.

12. The method according to claim 11, wherein the sending a sounding signal comprises:

stopping sending the sounding signal in an idle timeslot in the sounding timeslot, wherein the idle timeslot comprises a first silent timeslot and a second silent timeslot; and sending the first communication signal in a data transmission timeslot.

13. The method according to claim 12, wherein duration of the first silent timeslot is a maximum multi-path delay of the near-field reflection channel, and a value of the second silent timeslot enables a delay of an echo component to exceed a sum of the duration of the first silent timeslot and duration of the second silent timeslot, and a power of the echo multi-path component is less than a preset threshold.

* * * * *